US009161115B2

(12) United States Patent
Schrems et al.

(10) Patent No.: US 9,161,115 B2
(45) Date of Patent: Oct. 13, 2015

(54) CASE WITH HEADSET RETRACTION DEVICE

(71) Applicant: TURTLECELL LLC, Ann Arbor, MI (US)

(72) Inventors: Paul Schrems, Novi, MI (US); Nick Turnbull, Ann Arbor, MI (US)

(73) Assignee: TURTLECELL LLC, Ann Arbor, MI (US)

( * ) Notice: Subject to any disclaimer, the term of this patent is extended or adjusted under 35 U.S.C. 154(b) by 0 days.

(21) Appl. No.: 14/528,805

(22) Filed: Oct. 30, 2014

(65) Prior Publication Data

US 2015/0086062 A1    Mar. 26, 2015

Related U.S. Application Data

(63) Continuation of application No. PCT/US2013/039327, filed on May 2, 2013.

(60) Provisional application No. 61/642,139, filed on May 3, 2012, provisional application No. 61/785,093, filed on Mar. 14, 2013.

(51) Int. Cl.
| | |
|---|---|
| H04R 25/00 | (2006.01) |
| H04R 1/10 | (2006.01) |
| H04M 1/15 | (2006.01) |
| H04M 1/18 | (2006.01) |
| B65H 75/44 | (2006.01) |
| H04M 1/02 | (2006.01) |

(52) U.S. Cl.
CPC .......... *H04R 1/1033* (2013.01); *B65H 75/4431* (2013.01); *H04M 1/15* (2013.01); *H04M 1/185* (2013.01); *B65H 2701/3919* (2013.01); *H04M 1/0258* (2013.01)

(58) Field of Classification Search
USPC ................. 381/384; 242/385.4, 378.4, 400.1, 242/405.2
See application file for complete search history.

(56) References Cited

U.S. PATENT DOCUMENTS

| | | | |
|---|---|---|---|
| 5,867,355 | A | 2/1999 | Arai et al. |
| 5,938,137 | A | 8/1999 | Poulson |
| 5,954,288 | A | 9/1999 | Shih |
| 6,073,875 | A | 6/2000 | Paugh |
| 6,502,727 | B1 | 1/2003 | Decoteau |
| 6,542,757 | B2 | 4/2003 | Bae |
| 6,546,103 | B1 | 4/2003 | Wong |

(Continued)

FOREIGN PATENT DOCUMENTS

| | | |
|---|---|---|
| AU | 2004100381 A4 | 7/2004 |
| AU | 2012101165 A4 | 9/2012 |

(Continued)

OTHER PUBLICATIONS

International Preliminary Report on Patentability and Written Opinion for PCT/US2013/039327 dated Nov. 4, 2014.

(Continued)

*Primary Examiner* — Brian Ensey
*Assistant Examiner* — Julie X Dang
(74) *Attorney, Agent, or Firm* — Foley & Lardner LLP

(57) ABSTRACT

A headset retraction device for a portable media player generally includes a base and an arbor, wherein the arbor is configured to rotate within a cavity defined by the base, and the arbor and base are cooperatively configured to wind a cord of the headset in a single plane.

24 Claims, 19 Drawing Sheets

(56) References Cited

U.S. PATENT DOCUMENTS

| | | |
|---|---|---|
| 6,567,651 B2 | 5/2003 | Whitley |
| 6,578,683 B1 | 6/2003 | Burke et al. |
| 6,616,080 B1 | 9/2003 | Edwards et al. |
| 6,633,770 B1 | 10/2003 | Gitzinger et al. |
| 6,712,304 B1 | 3/2004 | Taylor |
| 6,731,956 B2 | 5/2004 | Hanna et al. |
| 6,763,111 B2 | 7/2004 | Liao |
| 6,926,130 B2 | 8/2005 | Skowronski |
| 7,151,912 B1 | 12/2006 | Morrison |
| 7,158,376 B2 | 1/2007 | Richardson et al. |
| 7,354,304 B2 | 4/2008 | Livingston |
| 7,515,706 B2 | 4/2009 | Park |
| 7,609,512 B2 | 10/2009 | Richardson et al. |
| 7,661,567 B2 | 2/2010 | Myers |
| 7,661,620 B2 | 2/2010 | Fields |
| 7,802,746 B2 | 9/2010 | Ito et al. |
| 7,848,087 B2 | 12/2010 | Huang |
| 7,889,494 B2 | 2/2011 | Stampfli |
| 7,933,122 B2 | 4/2011 | Richardson et al. |
| 8,059,852 B2 | 11/2011 | Cheng |
| 8,103,042 B2 | 1/2012 | Tan et al. |
| 8,165,646 B2 | 4/2012 | Zheng |
| 8,284,980 B2 | 10/2012 | Parker et al. |
| 8,334,772 B2 | 12/2012 | Triggiani |
| 8,365,887 B2 | 2/2013 | Fischer |
| 8,408,513 B2 | 4/2013 | Smith |
| 8,411,849 B1 | 4/2013 | McKenzie et al. |
| 8,472,657 B2 | 6/2013 | Singh |
| 8,577,412 B1 | 11/2013 | Bishop |
| 8,579,172 B2 | 11/2013 | Monaco et al. |
| 8,600,461 B2 | 12/2013 | Kroupa |
| 8,678,255 B2 | 3/2014 | Zhang et al. |
| 8,688,174 B2 | 4/2014 | Latham et al. |
| 8,737,670 B2 * | 5/2014 | Zheng ............ 381/384 |
| 8,746,519 B2 | 6/2014 | Young et al. |
| 8,774,446 B2 | 7/2014 | Merenda |
| 8,783,531 B2 | 7/2014 | Kroupa |
| 8,794,560 B2 | 8/2014 | Salentine et al. |
| 8,800,907 B2 | 8/2014 | Koenig et al. |
| 8,857,691 B2 | 10/2014 | Monaco et al. |
| 8,870,111 B2 * | 10/2014 | Kwankijpongsa et al. ... 242/378 |
| 2001/0035242 A1 | 11/2001 | Hughs et al. |
| 2002/0090981 A1 * | 7/2002 | Bae .............. 455/568 |
| 2003/0008550 A1 * | 1/2003 | Tse et al. ......... 439/501 |
| 2003/0022632 A1 | 1/2003 | Bernhart |
| 2003/0032461 A1 | 2/2003 | Desrosiers |
| 2003/0042348 A1 | 3/2003 | Salentine et al. |
| 2003/0157973 A1 | 8/2003 | Yang |
| 2004/0204165 A1 | 10/2004 | Huang |
| 2004/0256188 A1 | 12/2004 | Harcourt |
| 2005/0072819 A1 | 4/2005 | Maldonado et al. |
| 2005/0116684 A1 | 6/2005 | Kim |
| 2005/0255898 A1 | 11/2005 | Huang |
| 2006/0058081 A1 | 3/2006 | Reichenbach |
| 2006/0126883 A1 | 6/2006 | Thalheimer et al. |
| 2006/0281504 A1 | 12/2006 | Pint |
| 2006/0287006 A1 | 12/2006 | McIntyre et al. |
| 2007/0023559 A1 | 2/2007 | Scapillato et al. |
| 2007/0051842 A1 | 3/2007 | Pryor |
| 2007/0158158 A1 | 7/2007 | Ameche |
| 2007/0278265 A1 | 12/2007 | Contente |
| 2008/0080732 A1 | 4/2008 | Sneed |
| 2008/0119952 A1 * | 5/2008 | Smith et al. .......... 700/90 |
| 2008/0227419 A1 | 9/2008 | Traub |
| 2009/0016559 A1 | 1/2009 | Cleary |
| 2009/0069060 A1 | 3/2009 | Kim |
| 2011/0130174 A1 * | 6/2011 | Kroupa ............ 455/569.1 |
| 2011/0169451 A1 | 7/2011 | Stampfli |
| 2011/0170732 A1 | 7/2011 | Parker et al. |
| 2011/0203954 A1 | 8/2011 | Kroupa |
| 2011/0233078 A1 | 9/2011 | Monaco et al. |
| 2012/0074006 A1 * | 3/2012 | Monaco et al. .......... 206/320 |
| 2012/0077556 A1 | 3/2012 | McKendrick |
| 2012/0114162 A1 * | 5/2012 | Zheng ............ 381/384 |
| 2012/0138725 A1 | 6/2012 | Chen et al. |
| 2012/0167349 A1 | 7/2012 | Smith |
| 2012/0225701 A1 * | 9/2012 | Cataldo et al. ........ 455/575.1 |
| 2012/0314351 A1 | 12/2012 | Kroupa |
| 2013/0020425 A1 | 1/2013 | Grassi et al. |
| 2013/0029725 A1 | 1/2013 | Heil-Brice et al. |
| 2013/0056368 A1 | 3/2013 | Loredo |
| 2013/0094687 A1 | 4/2013 | Weinstein et al. |
| 2013/0129138 A1 | 5/2013 | Washington, Jr. |
| 2013/0208937 A1 | 8/2013 | Stern et al. |
| 2013/0238829 A1 | 9/2013 | Laycock et al. |
| 2014/0076750 A1 | 3/2014 | Monaco et al. |
| 2014/0105441 A1 | 4/2014 | Kroupa |
| 2014/0128128 A1 | 5/2014 | Bunton |
| 2014/0192995 A1 | 7/2014 | Cataldo et al. |
| 2014/0228075 A1 | 8/2014 | Baschnagel |

FOREIGN PATENT DOCUMENTS

| | | |
|---|---|---|
| CN | 201374798 Y | 12/2009 |
| CN | 201491061 U | 5/2010 |
| CN | 103812970 A | 5/2014 |
| GB | 2476321 | 6/2011 |
| KR | 20040077170 A | 9/2004 |
| KR | 2006083623 A | 7/2006 |
| KR | 200461079 Y1 | 6/2012 |
| KR | 101321008 B1 | 10/2013 |
| SU | 472475 A | 5/1975 |
| WO | WO 0143491 A1 | 6/2001 |
| WO | WO 2011123459 A1 | 10/2011 |
| WO | WO 2013138171 A9 | 9/2013 |
| WO | WO 2013166326 A1 | 11/2013 |

OTHER PUBLICATIONS

International Search Report for PCT/US2013/039327 dated Aug. 29, 2013.

* cited by examiner

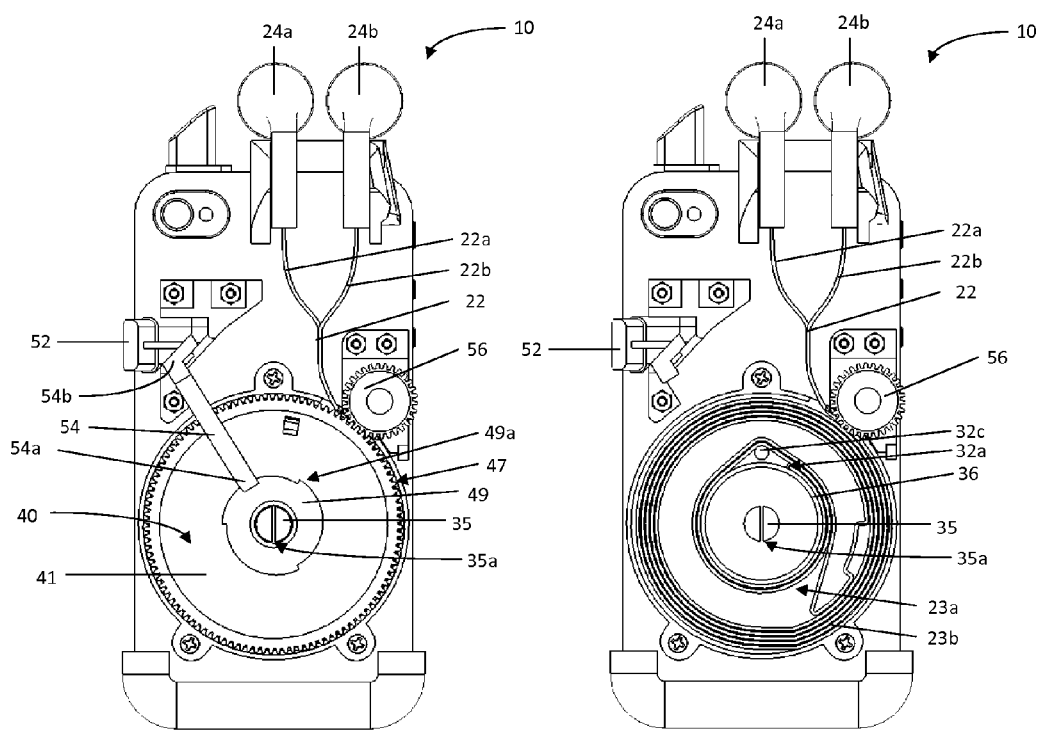

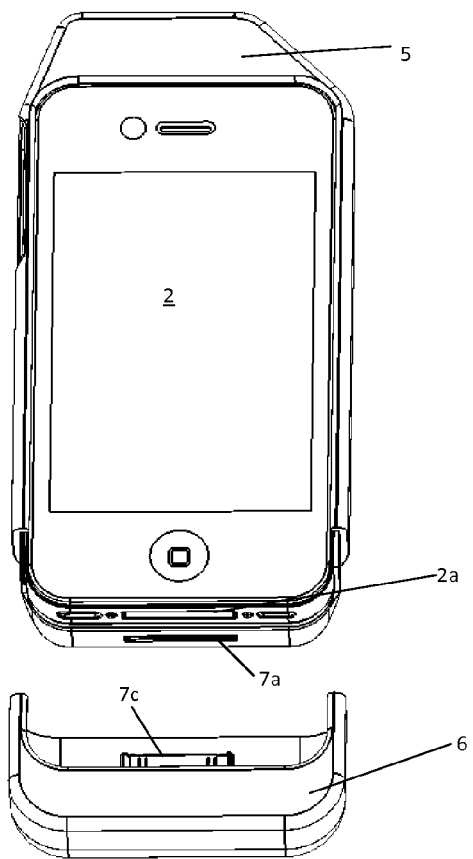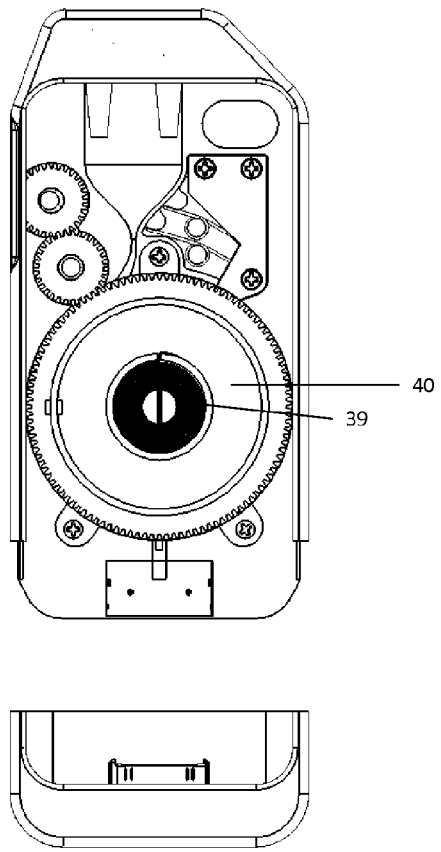
Fig. 14                  Fig. 15

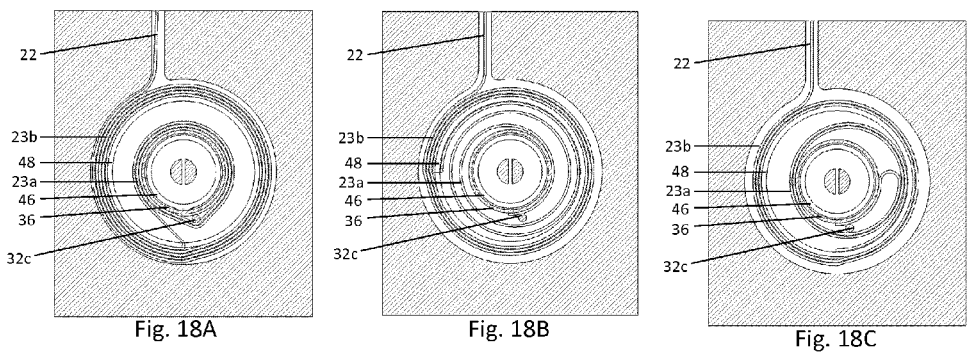
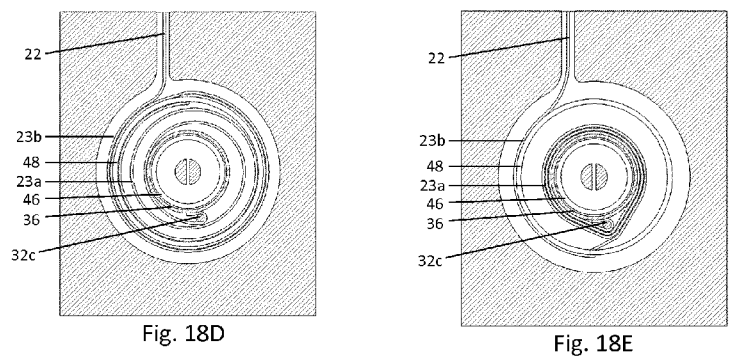

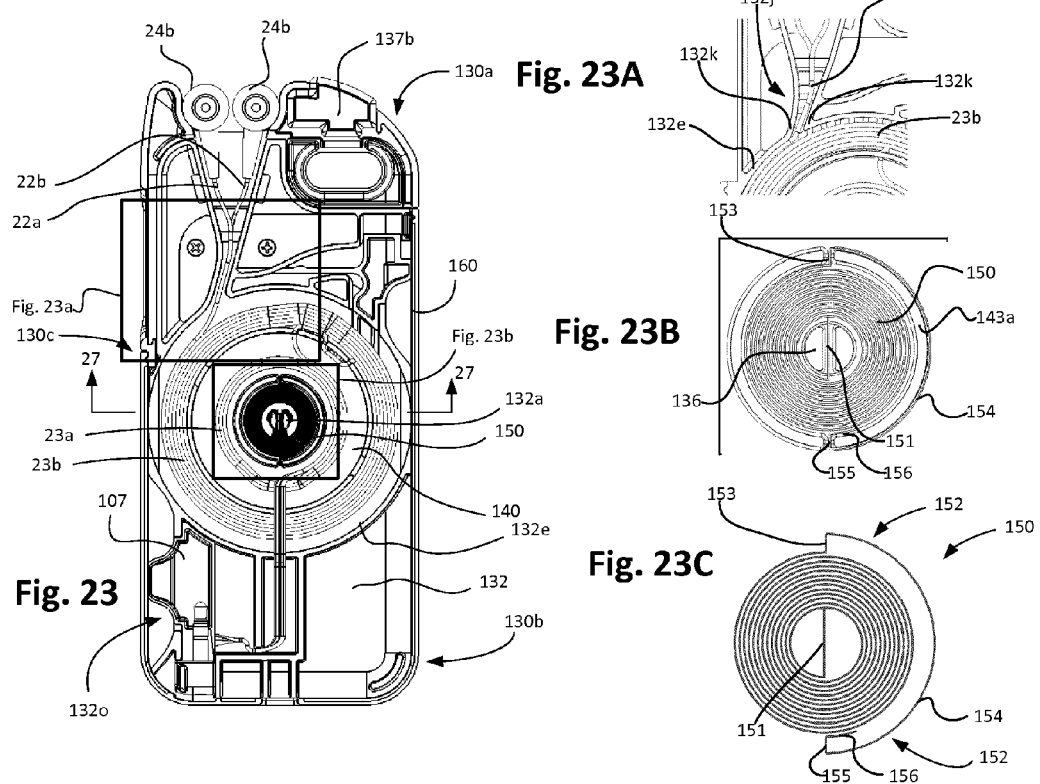

CASE WITH HEADSET RETRACTION DEVICE

CROSS-REFERENCE TO RELATED PATENT APPLICATIONS

The present application is a continuation of PCT/US2013/039327, filed May 2, 2013, which claims priority to and the benefit of U.S. Provisional Application Nos. 61/785,093, filed Mar. 14, 2013, and U.S. Provisional Patent Application No. 61/642,139, filed May 3, 2012. The entire disclosures of each of the foregoing patent applications are incorporated herein by reference.

BACKGROUND

The present disclosure relates generally to the field of cases for use with phones, portable media players, and other portable electronic devices. More particularly, the present disclosure relates to cases that have integrated headphones with a built-in retraction device for use with such electronic devices.

SUMMARY

According to an exemplary embodiment, a headset retraction device for a portable media player generally includes a base and an arbor, wherein the arbor is configured to rotate within a cavity defined by the base, and the arbor and base are cooperatively configured to wind a cord of the headset in a single plane. According to an exemplary embodiment, the headset retraction device may be incorporated within a case configured to receive therein a portable electronic device, such as a cellular phone, a personal digital assistant, a portable media player, or the like.

According to an exemplary embodiment, a headset retractor includes a headset, an arbor, and a clock spring. The headset includes one or more speakers for outputting a sound, a connector to be inserted into a portable media player, and a cord having one or more conductors extending continuously between the one or more speakers and the connector. The arbor is configured for the cord to be wound therearound. The clock spring is coupled to the arbor to rotate the arbor for winding the cord. The cord includes a retractable portion that is wound in a single plane about the arbor. The clock spring is wound in a single plane that is generally coplanar with the single plane in which the cord is wound.

According to an exemplary embodiment, case for a portable media player includes a base and a retraction mechanism. The base is configured to couple to the portable media player, and includes a first member and second member that define a cavity therebetween. The retraction mechanism includes an arbor and a clock spring disposed in the cavity of the base. The clock spring is configured to rotate the arbor relative to the base to wind a cord around the arbor. The first member includes a generally planar portion having an inner surface facing into the cavity and an outer surface configured to be disposed adjacent an outer surface of the portable media player when the case is coupled to the portable media player. The second member includes a generally planar portion having an inner surface facing into the cavity and an outer surface configured to be held by a user when the case is coupled to the portable media player. The arbor has a generally planar portion having an inner surface and an outer surface that engages the inner surface of the second member. The cord is positioned in the cavity and may contact the inner surface of the first member and the inner surface of the arbor.

BRIEF DESCRIPTION OF THE DRAWINGS

FIG. 7 is a partial bottom view of a case including a retraction device according to an exemplary embodiment.

FIG. 8 is a partial bottom view of a case including a retraction device according to an exemplary embodiment.

FIG. 14 is an partial exploded perspective view of case according to an exemplary embodiment.

FIG. 15 is a partial exploded top view of a case according to an exemplary embodiment.

FIG. 18A is a partial, schematic view of a retraction device according to an exemplary embodiment during a first stage of retraction.

FIG. 18B is a partial, schematic view of the retraction device as shown in FIG. 18A during a second stage of refraction.

FIG. 18C is a partial, schematic view of the retraction device as shown in FIG. 18A during a third stage of retraction.

FIG. 18D is a partial, schematic view of the retraction device as shown in FIG. 18A during a fourth stage of retraction.

FIG. 18E is a partial, schematic view of the retraction device as shown in FIG. 18A during a fifth stage of retraction.

FIG. 23 is a partial front plan view of the case as shown in FIG. 19.

FIG. 23A is a partial front view of a portion of the case taken from FIG. 23.

FIG. 23B is a partial front view of another portion of the case taken from FIG. 23.

FIG. 23C is a front plan view of a spring component of the case as shown in FIG. 19.

DETAILED DESCRIPTION

Referring generally to the figures, according to an exemplary embodiment, a case or housing 4 for a portable electronic device (shown, for example, as a phone or portable medial player 2) includes a headset (e.g., headphones) retractor 10. For ease of reference, the portable electronic device may be referred to herein as a portable media player 2, although it should be understood that the case and headset retractor described herein may be used with a wide variety of portable electronic devices, including phones, gaming systems, portable media players, and the like.

Figure 3:
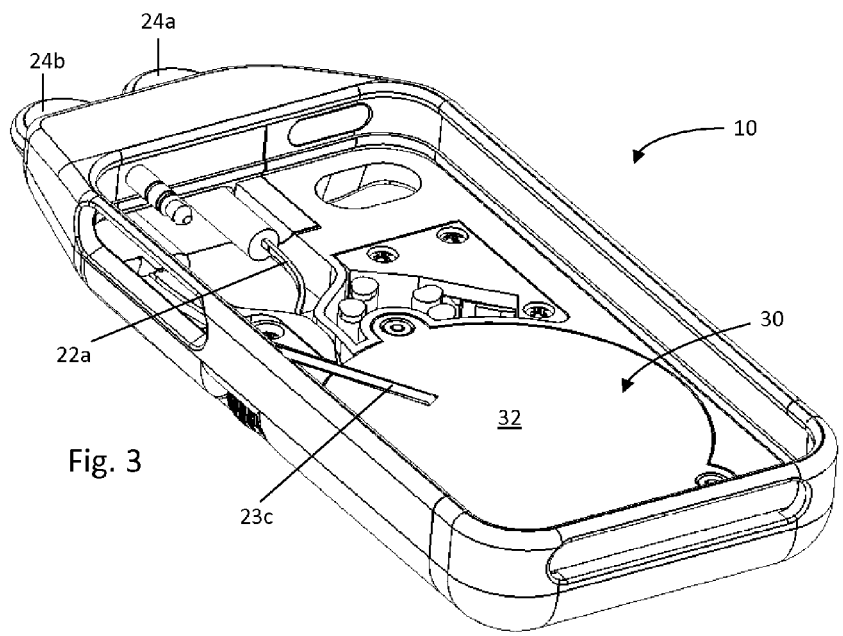
FIG. 3 is a partial perspective view of a case including a retraction device according to an exemplary embodiment.
Figure 4:
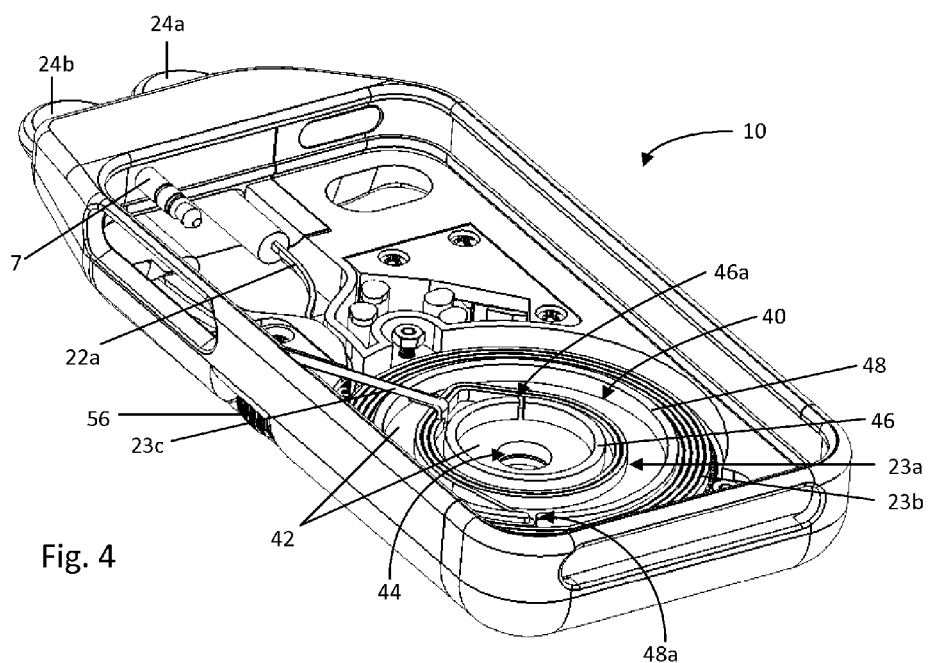
FIG. 4 is a partial perspective view of a case including a retraction device according to an exemplary embodiment.

The headset retractor 10 generally includes a headset 20, a base 30 (see, e.g., FIG. 3), and an arbor or spindle 40 (see, e.g., FIG. 4). Generally speaking, the headset retractor 10 is configured to retract a cord 22 of the headset 20 (e.g., to store the cord when the headset 20 is not being used) and to allow extension of the cord 22 (e.g., when the headset 20 is being used). The headset retractor 10 may also be configured to mount or couple to the portable media player 2, for example, by being configured as a case 4 for the portable media player 2.

Figure 5:
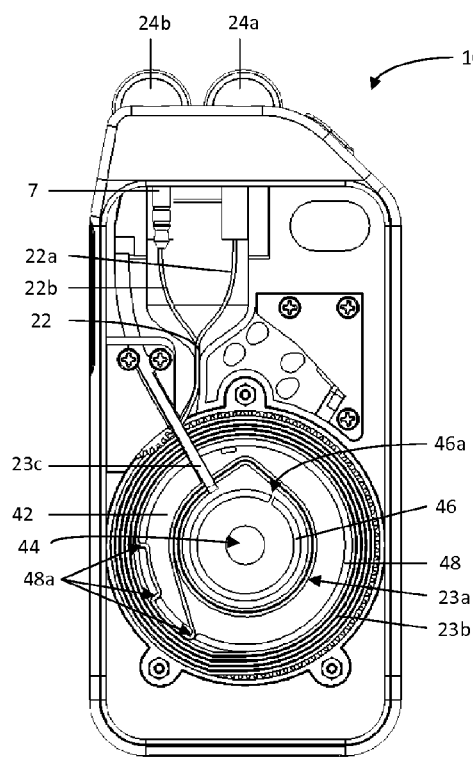
FIG. 5 is a partial top view of a case including a retraction device according to an exemplary embodiment.
Figure 6:
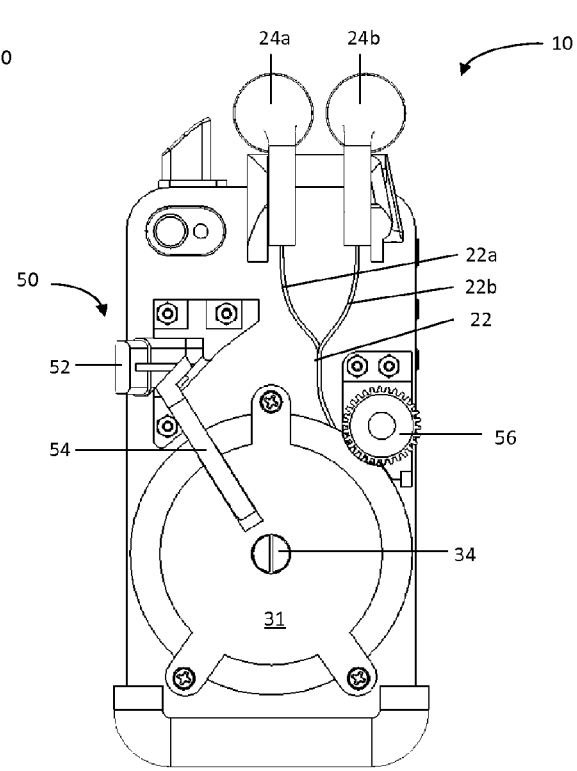
FIG. 6 is a partial bottom view of a case including a retraction device according to an exemplary embodiment.
Figure 9:
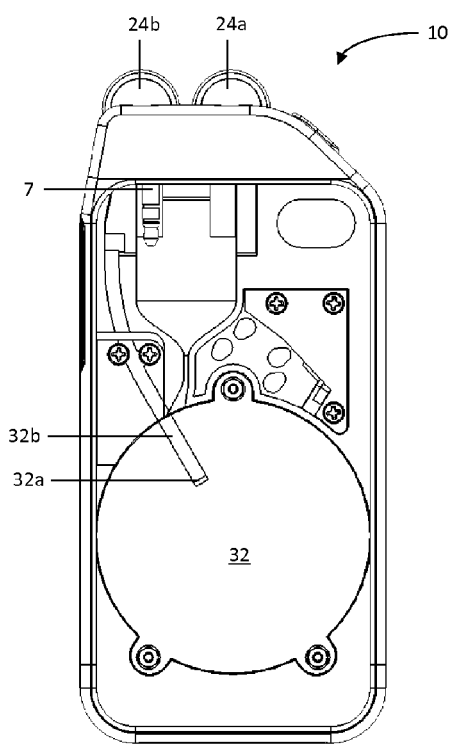
FIG. 9 is a partial top view of a case including a retraction device according to an exemplary embodiment.
Figure 10:
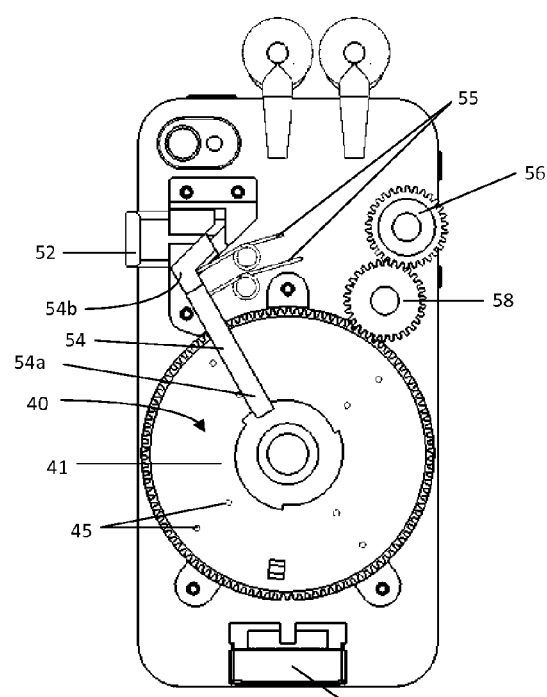
FIG. 10 is a partial bottom view of a case including a retraction device according to an exemplary embodiment.

According to an exemplary embodiment, the headset 20 generally includes the cord 22 and one or more speakers or earbuds 24a, 24b. The cord 22 extends generally between a first or inner end that is configured to couple directly or indirectly to the portable media player 2 and a second or outer end that is coupled to the speakers 24a, 24b. The cord 22 further includes one or more conductors 22a, 22b (see, e.g., FIG. 5) that are each associated with and coupled to one of the speakers 24a, 24b at the second end. The conductors 22a, 22b are individually insulated (e.g., with a polymer or other suitable jacket), and the conductors 22a, 22b may be coupled to each other in parallel over a portion of a length of the cord 22 (e.g., with an outer polymer jacket). The speakers 24a, 24b may, for example, be speakers as are commonly used with in-ear or bud-style headsets or earphones. The headset 20 may further include a microphone (not shown), such that the cord 22 includes an additional conductor (not shown) associated with and coupled to the microphone.

According to an exemplary embodiment, the base 30 and arbor 40 are cooperatively configured for the arbor 40 to rotate relative to the base 30 to wind and unwind the cord 22 of the headset 20. More particularly, the base 30 includes a first portion 31 and a second portion 32, which cooperatively define a cavity 33 in which the arbor 40 is positioned, such that the cord 22 may be wound or unwound from the arbor 40 so as to be drawn into or out of the cavity 33.

According to an exemplary embodiment, the first and second portions 31, 32 of the base 30 and the arbor 40 are cooperatively sized and shaped for the arbor 40 to rotate within the cavity 33 of the base 30. For example, the arbor 40 and the cavity 33 as defined by the first and second portions 31, 32 of the base 30 may be generally planar and generally circular. More particularly, the arbor 40 includes first and second faces 41, 42, which are generally planar and are configured to be placed generally adjacent to, or in generally constant proximity with, the first and second portions 31, 32, respectively, of the base 30. The first and second portions 31, 32 similarly include generally planar faces, which correspond with the planar faces 41, 42 of the arbor 40. As will be recognized by those skilled in the art, the base 30 and arbor 40 may be sized and shaped in other manners sufficient to allow rotation of the arbor 40 within the cavity 33 of the base 30.

Figure 16:
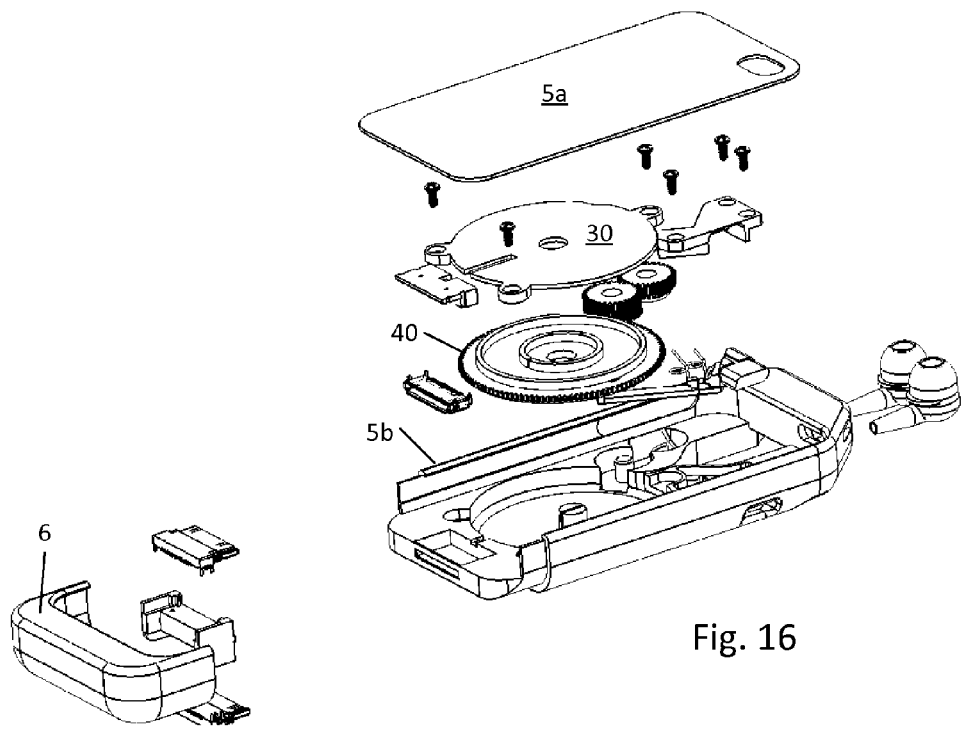
FIG. 16 is a partial, upper perspective exploded view of a case including a retraction device according to an exemplary embodiment.
Figure 17:
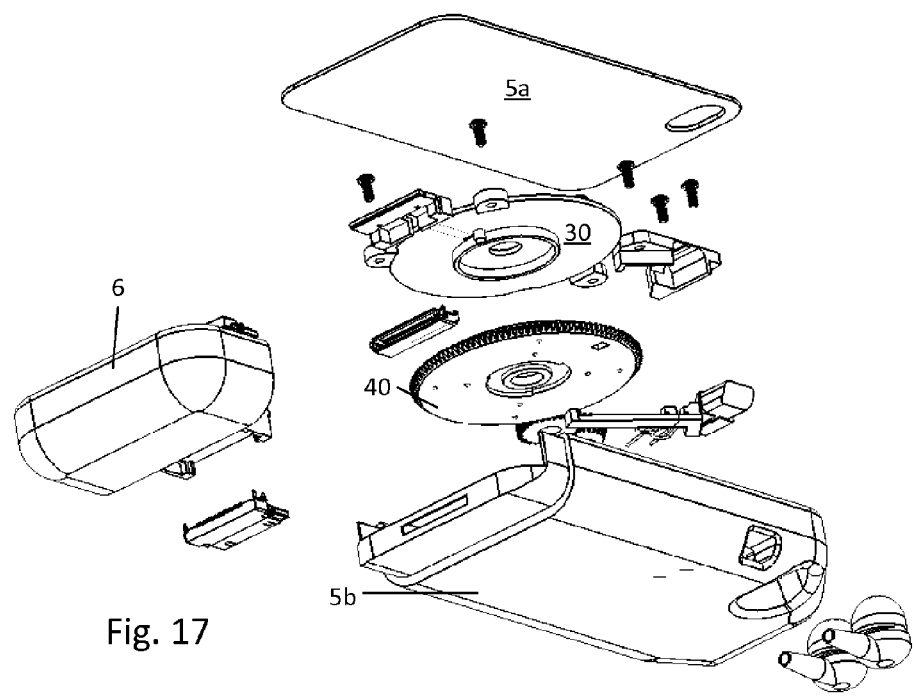
FIG. 17 is a partial, lower perspective exploded view of a case including a retraction device according to an exemplary embodiment.

According to an exemplary embodiment, the base 30 and arbor 40 cooperatively define a central axis about which the arbor 40 rotates and about which the cord 22 is wound. For example, the second portion 32 of the base may include a central rounded post or male member 35, which is received by a central aperture or female receptacle 44 of the arbor 40 (see, e.g., FIG. 8). According to other exemplary embodiments, the base 30 and arbor 40 may be configured in other manners to define a central axis of rotation including, for example, providing a male member on the first portion 31 of the base 30 (see, e.g., FIGS. 11 and 16), providing a male member on the arbor 40 and a female receptacle on the first portion 31 and/or second portion 32 of the base 30, and the like.

According to an exemplary embodiment, the first face 41 of the arbor 40 and the first portion 31 of the base 30 are configured for the first face 41 to slide against the generally planar face of the first portion 31. For example, the first face 41 of the arbor 40 may include a series of protrusions 45 (e.g., nubs, members, etc.), which interface or slidingly engage the inner surface of first portion 31 (e.g., to act as a bearing or otherwise reduce friction that might otherwise be present between the arbor 40 and the first portion 31 of the base 30). Generally speaking, the protrusions 45 are configured so as to space the first face 41 of the arbor 40 away from the first portion 31 of the base, while minimizing the gap therebetween so as to minimize the combined thickness of the arbor 40 and the base 30. The protrusions 45 may, for example, extend generally perpendicular from the first face 41 of the arbor 40 a distance of approximately 0.01-0.05 inches (e.g., approximately 0.02 inches) and have a rounded end, such that each protrusion 45 contacts the surface of the first portion 31 at a single point. The protrusions 45 are provided in a sufficient number for the arbor 40 rotate in a generally constant plane relative to the first portion 31 of the base, for example, between three and twenty (e.g., eight).

According to other exemplary embodiments, the arbor 40 and/or the first portion 31 of the base 30 may be configured in other manners to allow sliding therebetween including, for example, the first face 41 of the arbor 40 may directly engage the first portion 31 of the base 30 (i.e., without protrusions), other friction reducing means may instead or additionally be used (e.g., lubricants, roller or ball bearings, etc.), protrusions may instead or additionally be provided on the first portion 31 of the base 30, the protrusions may be configured in other manners, such as with a different shape (e.g., one or more radially- or circumferentially-extending elongate ridges, flat or pointed ends, etc.), or being different in number, and the like.

According to an exemplary embodiment, the base 30 and the arbor 40 cooperatively define a cord portion or cord storage area 34 in the cavity 33. More particularly, the base 30 and the arbor 40 are configured such that the second face 42 of the arbor 40 is spaced apart from the surface of the second portion 32 of the base 30 a generally constant distance so as to define the cord storage area 34 therebetween.

According to an exemplary embodiment, the base 30 and the arbor 40 are cooperatively configured such that the cord 22 is stored or wound in the cord storage area 34 generally in a single plane. That is, the base 30 and the arbor 40 are configured to wind the cord 22 into one or more windings wherein each revolution of the cord 22 generally does not overlap any other revolution of the cord 22 in an axial direction and/or a single plane passes through each entire revolution of the cord 22 in the winding. For example, the second face 42 of the arbor 40 is spaced apart from the inner surface of the second portion 32 of the base approximately 1.1-1.8 times the thickness of the cord 22, or more preferably approximately 1.25-1.5 times the thickness of the cord 22 (e.g., approximately 1.35-1.4 times). For example, the cord 22 may have a generally circular cross-section having a diameter (i.e., thickness) of approximately 0.075-0.01 inches, or more preferably approximately 0.075-0.08 inches (e.g., approximately 0.78 inches or approximately 2 mm), while the second face 42 of the arbor and the second portion 32 of the base are spaced apart approximately 0.105-0.115 inches, or more preferably approximately 0.1075-0.11 inches (e.g., approximately 0.1082 inches or 2.75 mm). Configured in this manner, the cord 22 may be wound in a generally coplanar manner. Winding the cord 22 in a generally constant plane or such that successive revolutions of the cord 22 do not overlap each other may be beneficial in several aspects including, for example, minimizing the thickness of the retraction device 10 and preventing binding of the cord 22, since a adjacent revolutions of the cord 22 could not wedge or slide between another revolution of the cord 22 and the arbor 40 or the second portion 32 of the base.

According to other exemplary embodiments where the cord 22 does not have a circular cross-section, the spacing between the second face 42 of the arbor 40 and the second portion 32 may be determined according to the major and/or minor dimensions of the cord 22 (e.g., if the conductors 22a, 22b are joined in parallel so as to form a generally oblong or rectangular cross-section, such as a cord having approximate dimensions of 2-3 mm×0.75-1 mm). For example, the spacing of the second face 42 and the second portion 32 may be approximately 1.1-1.8 times the major dimension of the cord 22, or more preferably approximately 1.25-1.5 times the major dimension of the cord 22 (e.g., approximately 1.35-1.4 times). For example, the cord 22 may have a generally constant major cross-sectional dimension that is approximately 0.075-0.01 inches, or more preferably approximately 0.075-0.08 inches (e.g., approximately 0.078 inches or 2 mm), while the second face 42 of the arbor and the second portion 32 of the base are spaced apart approximately 0.105-0.115 inches, or more preferably approximately 0.1075-0.11 inches (e.g., approximately 0.1082 inches or 2.75 mm). According to another example, the cord 22 may have a generally constant major cross-sectional dimension that is approximately 0.01 inches (i.e., approximately 2.5 mm). By configuring the spacing between the second face 42 of the arbor 40 and the second portion 32 to be greater than the major dimension of the cord 22, the cord 22 may be wound such that the major dimension extends in a generally axial direction.

According to other exemplary embodiments, the cord 22 and spacing between the second face 42 of the arbor 40 and the second portion 32 of the base 30 may be configured in other manners including, for example, smaller or larger diameter or major or minor cross-sectional dimension of the cord 22, smaller or larger spacing, and the like. According to still other exemplary embodiments, the base 30 and the arbor 40 may be configured in other manners including, for example, to allow a non-planar winding (e.g., the spacing of the arbor 40 and the second portion 32 of approximately twice or more than the thickness of the cord 22) to as to still provide a thin retraction device 10.

According to an exemplary embodiment, the arbor 40 includes an inner flange 46 that is generally concentric with the aperture 44. The inner flange 46 is of a generally constant height relative to the second face 42 of the arbor 40, so as to define the height or thickness of the cord storage portion 34 of the cavity 33. The inner flange 46 is also configured to slide relative to the second portion 32 of the base 30, such that the arbor 40 may rotate relative thereto. Furthermore, the second portion 32 of the base 30 may include an inner flange 36 that is configured to engage the outer surface of the inner flange 46 of the arbor 40, such that the arbor 40 rotates concentrically with the second portion 32 of the base 30. According to other exemplary embodiments, the respective inner flanges 36, 46 of the base 30 and arbor 40 may be configured in other manners including, for example the inner flange 36 of the base 30 being configured to define the height or thickness of the cord storage portion 34 of the cavity 33.

According to an exemplary embodiment, the arbor 40 includes an outer flange 48 that is generally concentric with the aperture 44. The outer flange 48 is of a generally constant height relative to the second face 42 of the arbor 40 and may, instead or in addition to the inner flange 46, define the height or thickness of the cord storage portion 34 of the cavity 33. For example, the outer flange 48 may work in conjunction with the inner flange 46, such that the second planar surface 42 is spaced apart from the second portion 32 of the base 30 as the arbor 40 is rotated within the cavity 33 of the base 30.

The inner and outer flanges 46, 48 of the arbor are configured to define inner and outer portions 34a, 34b of the cord storage portion 34 of the cavity 33. More particularly, the inner portion 34a of the cavity 33 is positioned between the inner flange 46 and the outer flange 48 and is configured to store the inner winding 23a of the cord 22. The outer portion 34b of the cavity 33 is positioned radially outward of the outer flange 48 and is configured to store an outer winding 23b of the cord 22. The one or more slots 48a of the outer flange 48 are configured such that the cord 22 passes from the outer storage portion 34b to the inner storage portion 34a, such that the outer winding 23b is formed radially outward of the outer flange 48 and that the inner winding 23a is formed radially inward of the outer flange 48. Advantageously, the inner and outer portions 34a, 34b of the cord storage portion 34 are generally coplanar with the cavity 33a in which the spring 39 is positioned, which allows for the spring 39, inner winding 23a, and outer winding 23b to be in a coplanar relationship to minimize the thickness of the case 4.

According to an exemplary embodiment, the inner flange 36 of the second portion 32 of the base and/or the inner flange 46 of the arbor 40 are configured to define a spring cavity 33a radially inward thereof. A spring 39 (e.g., a coiled clock or power spring) is positioned with the spring cavity 33a and is configured to cause rotation of the arbor 40 relative to the base 30. For example, an inner end of the spring 39 is coupled to the male member 35 (e.g., by being placed in a slot 35a of the male member 35) and an outer end of the spring is coupled to the arbor 40 (e.g., by being placed in a slot 46a of inner flange 46 of the arbor 40). Configured in this manner, when the arbor 40 is rotated relative to the base 30, the spring 39 applies a counter-torque to the arbor 40 to cause rotation thereof. According to other exemplary embodiments, the spring 39 may be configured in other manners to cause rotation between the arbor 40 and the base 30 including, for example, being coupled to the arbor 40 and base 30 in other manners (e.g., instead or in addition using fasteners or adhesives, altering connection of the inner and outer ends of the spring 39 depending on the orientation and configuration of the aperture and male member).

According to an exemplary embodiment, the arbor 40 is configured to couple to the cord 22, such that rotation of the arbor 40 causes the cord 22 to be drawn into the cord storage portion 34 of the cavity 33 to be wound around the central axis of rotation (e.g., as defined by the male member 35). For example, the cord 22 may be coupled to the arbor 40 by way of one or more slots or cutouts in at least one of the inner flange 46 and outer flange 48. According to one exemplary embodiment, the outer flange includes a slot 48a configured to tightly hold the cord 22 placed therein. The slot 48a is sized to tightly fit or compress the cord 22 therein and may further include pointed or rounded edges or corners for engaging the cord 22 or its casing. Furthermore, the outer flange 48 may include a series of three slots 48a configured for the cord 22 to be woven therebetween so as to prevent the cord 22 from slipping relative to the outer flange 48. According to another exemplary embodiment, the cord 22 may be affixed to coupled to the arbor 40, instead or additionally, by threading the cord 22 through a slot or aperture positioned below the flange 48 and/or on the bottom part of the flange 48, such slot or aperture tightly fitting the cord 22 and also allowing the cord 22 to transfer from inside the flange 48 to outside the flange 48 (i.e., to form the inner and outer windings 23a, 23b of the cord 22). According to other exemplary embodiments, the cord 22 may be coupled to the flange in other manners including, for example, instead or additionally using fasteners or adhesives, using more or fewer slots, etc.

With reference to FIGS. 18A-18E, according to an exemplary embodiment, the headset retractor 10 is configured to minimize localized wear on the cord 22 (i.e., when retracted into the cavity 33 to be wound therein and when extended or pulled from the cavity 33). In particular, the headset retractor 10 is configured to generally avoid twisting of the cord 22 (i.e., about a central axis of the cord 22) within the retraction device 10 by wrapping the cord 22 about the rotational axis of the arbor 40 to form an inner winding 23a and an outer winding 23b. That is, the headset retractor 10 is configured to wind or wrap the cord 22 about the arbor 40 to form the inner winding 23a and the outer winding 23b of the cord 22. When the cord 22 is in a fully retracted position, the inner winding 23a is wound about the arbor 40 in the opposite direction of the outer winding 23b (e.g., clockwise vs. counterclockwise), and in a fully extended position, the inner winding 23a is wound about the arbor 40 in the opposite direction compared to itself in the fully retracted position. That is, as the cord 22 is extended, the inner winding 23a unwinds from the arbor 40 and then rewinds around the arbor 40 in the opposite direction.

According to an exemplary embodiment, an innermost portion 23c of the cord 22 extends from the inner winding 23a radially outward and is positively coupled to a connector 7 that is configured to releasably couple to an audio output or port of the portable media player 2. The second portion 32 of the base 30 includes an aperture 32a located proximate the inner flange 36, which allows the innermost portion 23c of the cord 22 to exit the cord storage portion 34 of the cavity 33 and extend to the connector 7. The second portion 32 may also include a recess or channel 32b configured for the innermost portion 23c of the cord 22 to be placed therein, so as to prevent movement of the cord 22 and/or to minimize the thickness of the retraction device 10.

According exemplary embodiment, the second portion 32 of the base 30 also includes a post 32c about which the inner winding 23b is wrapped or bent when the inner winding 23a changes its winding direction about the arbor 40 as the cord 22 is extended (e.g., changing from counterclockwise to clockwise). The post 32c is configured to prevent localized stress on the wire, so as to prevent twisting or localized stress on the cord 22. For example, the post 32c is positioned radially outward of the inner flanges 36, 46 of the base 30 and arbor 40, respectively, and includes a curved portion that is configured to engage the cord 22 for bending the cord 22 in a gradual manner (e.g., as opposed to twisting the cord 22, or pinching or forming a sharp bend in the cord 22). According to an exemplary embodiment, the curved portion of the post 32c has a diameter of approximately 0.078 to 0.197 inches (e.g., approximately 0.098 inches or 2.5 mm). According to other exemplary embodiments, the curved portion of the post 32c has a radius of approximately 2.5 to 5 times the thickness or major dimension of the cord 22, and is more preferably 3-3.5 times the thickness or major dimension of the cord 22 (e.g., approximately 3.3 times the thickness or major dimension). According to other exemplary embodiments, the post 32c may be configured in other manners including, for example, different sizes, shapes, profiles, etc.

As shown in FIGS. 2-5, for example, the connector 7 is a conventional audio plug (e.g., an eighth inch plug for one channel (i.e., mono), two channels (i.e., stereo, or mono and microphone), or three channels (i.e., stereo and microphone)), and the audio port (not shown) of the portable media player 2 is a corresponding headphone jack (e.g., an eighth inch one, two, or three channel jack).

According to the exemplary embodiment shown in FIGS. 10 and 13-15, for example, the connector 7 may be another type of connector configured for functions in addition to transferring audio signals (e.g., data transfer, battery charging, etc.). For example, the connector may be a 30-pin plug (e.g., as used with many Apple® brand products), and the port of the portable media player 2 is a corresponding type of jack, port, or adapter. According to other exemplary embodiments, the connector 7 and corresponding port may be of another type, such as USB, mini-USB, or other non-standard plugs used by various manufacturers. Advantageously, coupling to a data connector (e.g., 30-pin connector or USB port) may allow for additional functionality or uses than connection to a conventional audio jack of the portable media player 2. For example, connection to an audio jack may disable other functions of the portable media player 2 (e.g., playing audio through a speaker, sounding of a ringer, etc.), while use of a data connection may provide various manners for overriding such disabling (e.g., with execution of a program or application allowing selection between the headset 20 and other audio output means of the portable media player 2 despite generally constant connection of the headset 20 to an output of the portable media player 2).

FIGS. 18A-18E are sequential figures illustrating the cord 22 being extended from the retractor 10 through various stages of retraction. FIG. 18A depicts the cord 22 in a fully retracted position. The outer winding 23b is wound around the outer flange 48 of the arbor 40 in a clockwise direction, and the inner winding 23a is wound around the inner flange 46 of the arbor 40 in a counterclockwise direction. As the cord 22 is extended or pulled from the cavity 33, the arbor 40 rotates in a clockwise direction. The inner winding 23a begins to unwind from the inner flange 46 (see FIG. 18B) and rewraps or rewinds around the inner flange 46 in a clockwise direction (see FIGS. 18C-18D) until being tightened around the inner flange 46 to prevent further rotation of the arbor 40 to thereby prevent further extension of the cord 22 from the cavity 33.

Configured in this manner, the portion of the cord 22 forming the inner winding 23a remains within the inner storage portion 34a, while the portion of the cord 22 forming the outer winding 23b may be extended or pulled from the cavity 33. By wrapping the inner winding 23a of the cord 22 in the opposite direction of the outer winding 23b (i.e., when in the fully refracted position) and rewrapping the inner winding 23a in the opposite direction (i.e., when in the fully extended position), the inner winding 23a requires approximately half the revolutions around the arbor 40 as the outer winding 23b to allow full extension of the cord 22 form the cavity 33. For example, in the fully retracted position, the inner winding 23a may form approximately three revolutions about the arbor 40, while the outer winding 23b may form approximately six revolutions about the arbor 40. FIG. 18E depicts the inner winding 23a as limiting extension of the cord 22 by having a portion of the cord 22 provide slightly less than half the revolutions provided for the outer winding 23b (i.e., since when the inner winding is tightened or slack is removed, a portion of the outer winding 23b remains within the cavity, the slot 48a being approximately ½ of a rotation or 170 degrees from an exit or opening 37 of the cavity 33). According to other exemplary embodiments, the inner winding 23b may be configured to limit extension of the cord 22 by preventing rotation of the slot 48a to different positions relative to the opening 37 (e.g., between approximately 0 and 360 degrees). According to still other exemplary embodiments, the outer winding 23b may limit extension of the cord 22 from the cavity 33, the outer winding 23b having more revolutions worth of cord 22 than the inner winding 23a, such that the slot 48a may align with the opening 37 with generally the entirety of the cord 22 of the outer winding 23b having exited the cavity 33 and the inner winding 23a having slack. According to other exemplary embodiments, the inner and outer windings 23a, 23b may be configured in other manners including, for example, more or fewer revolutions of the cord 22.

According to an exemplary embodiment, the retraction device 10 is configured to prevent retraction of the cord 22 when the headset 20 is in use. More particularly, the retraction device 10 includes a latch mechanism 50 (e.g., an arm) configured to engage the arbor 40 to selectively prevent rotation of the arbor 40.

According to an exemplary embodiment, the latch mechanism 50 includes an actuator or button 52 and an arm 54. The actuator 52 is configured to be touched or pressed by a user for moving the arm 54 along a radial path into and out of engagement with a ratcheted or toothed portion 49a in an axially extending recess 49 of the arbor 40. More particularly, the arm 54 extends generally straight between a first end 54b configured engage the actuator 52 and a second end 54a having an axially extending protrusion configured to extend into the recess 49 and engage the ratcheted or toothed portion 49a of the arbor 40. The ratcheted portion 49a includes a series of radially inwardly protruding teeth, each tooth having a radially extending step or ledge that is configured to engage the second end 54a of the arm 54 and the recess being gradually tapered between each tooth. The latch mechanism 50 is generally disposed within a channel 31a of the first portion 31 of the base 30, which is configured to allow the latch mechanism 50 to slide in a radial direction therein. Configured in this manner, the arbor 40 and the latch mechanism 50 are cooperatively configured for the cord 22 to be extended or pulled from the base 30 with the second end 54b of the arm 54 sliding gradually outwardly along the tapered portions of the ratcheted portion 49a of the arbor 40 as the arbor 40 is rotated.

As the cord 22 is extended, the spring 39 applies a counter-torque to the arbor 40 causing the arbor 40 to rotate opposite the direction of retraction, such that the second end 54b of the arm 54 slides gradually inwardly along the tapered portions of the recess 49 so as to engage the step or ledge of a tooth or ratcheted portions 49a and prevent further rotation of the arbor 40 and refraction of the cord 22. One or more ratchet or springs 55 of the latch mechanism are configured to bias the arm 54 to a normally extended position (i.e., radially outward), such that the second end 54a of the arm 54 is maintains engagement against the tapered portion and/or teeth of the recess. A user may then press the actuator 52 causing the second end 54b of the arm 54 to move radially inward and to disengage the ratcheted portion 49a of the arbor 40, the spring 39 then causing the arbor 40 to rotate so as to retract the cord 22 into the cavity 33 of the base 30. According to other exemplary embodiments, the latch or ratchet mechanism 50 may be configured in other manners including, for example, providing a similarly toothed or ratcheted protrusion (i.e., as opposed to a recess) that is engaged by a normally inwardly spring biased arm, providing a toothed portion at an outer periphery of the arbor 40 that is engaged by a normally inwardly spring biased arm, and the like.

According to an exemplary embodiment, the headset retractor 10 includes a retraction wheel 56 that is configured to allow a user to manually retract the cord 22 into the cavity 33 (e.g., instead or in addition to the retraction provided by the spring 39). The retraction wheel or gear 56 is accessibly to a user (e.g., finger or thumb) and is geared for direct engagement or indirect engagement (e.g., with an intermediate geared wheel 58) with a circumferentially geared portion 47 of the arbor 40. The retraction wheel 56 may, for example, be used to fully retract the cord 32, such as if the spring 39 does not fully retract the cord 32 on its own. According to other exemplary embodiments, the retraction wheel 56 may be configured in other manners including, for example, frictional engagement directly or indirectly with the periphery of the arbor 40.

According to an exemplary embodiment, the headset retractor or retraction storage device 10 is configured as a case 4 for the portable media player 2. The case 4 is configured to generally house the retraction device 10, couple the retraction device 10 to the portable media player 2, and cover at least a portion of the media player 2. For example, the case 4 may be configured to generally cover back and side portions of the portable media player 2, while exposing an upper surface or portable media player 2. The case 4 may also include various access apertures or soft portions for covering user input buttons, cameras, speakers, microphones, or ports of the portable media player 2.

Figure 11:
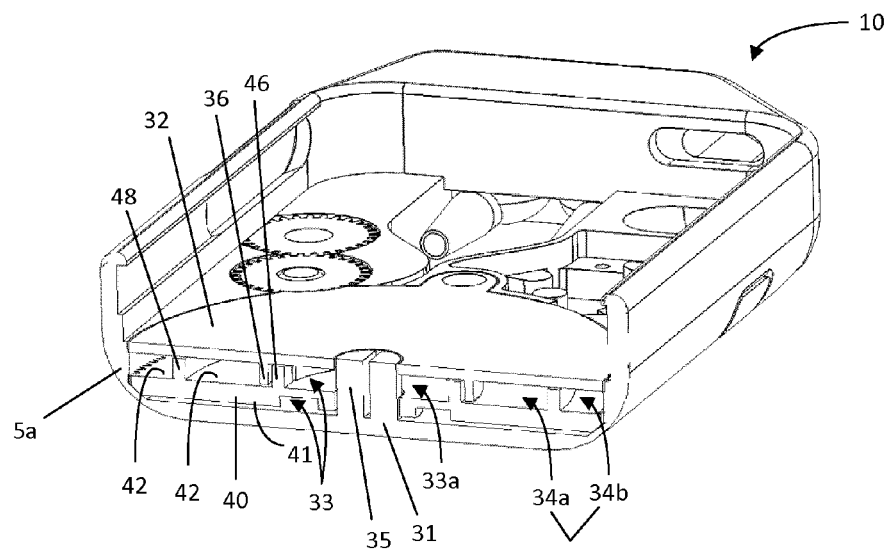
FIG. 11 is a partial perspective cross-sectional view of a case including a retraction device according to an exemplary embodiment.
Figure 12:
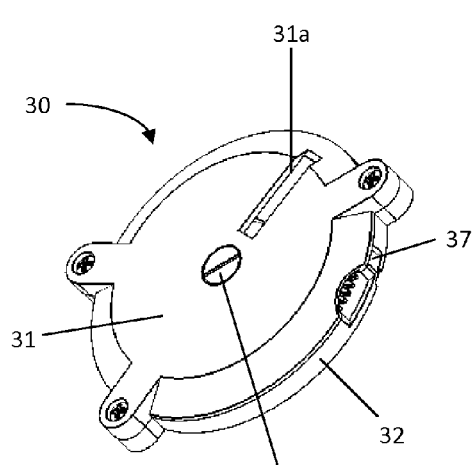
FIG. 12 is a partial perspective view of an assembly of a retraction device according to an exemplary embodiment.
Figure 13:
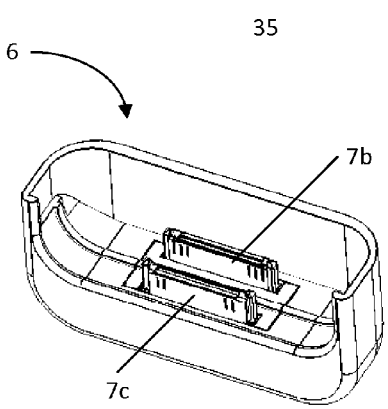
FIG. 13 is a partial perspective view of a portion of a case according to an exemplary embodiment.

According to an exemplary embodiment, an upper portion 5 of the case 4 generally includes an inner portion 5a configured to be placed generally against the back portion of the portable media player 2, while an outer portion 5b is generally configured to be exposed (e.g., to be held by the user). While FIG. 12 depicts the first and second portions 31, 32 of the base 30 as being separate from the case 4, various portions of the base 30 may be formed integrally with portions of the case 4. For example, as shown in FIG. 11, the first portion 31 of the base 30 may be formed integrally with the outer portion 5b of the case 4, such that various functions and features of the first portion 31 of the base 30 are incorporated into the outer portion 5b of the case 4, such as the channel 31a. According to other exemplary embodiments, other integral formation of the various components of the case 4 and the retraction device 10 are contemplated (e.g., combining various features and functions of the second portion 32 of the base 30 with the inner portion 5a of the case).

Figure 1:
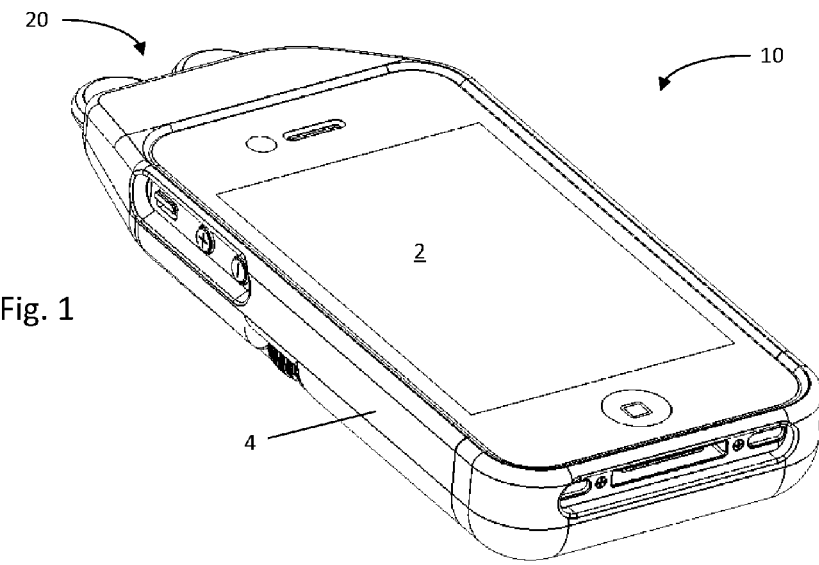
FIG. 1 is a perspective view of a case for a portable electronic device such as a cellular phone that includes a retraction device according to an exemplary embodiment.
Figure 2:
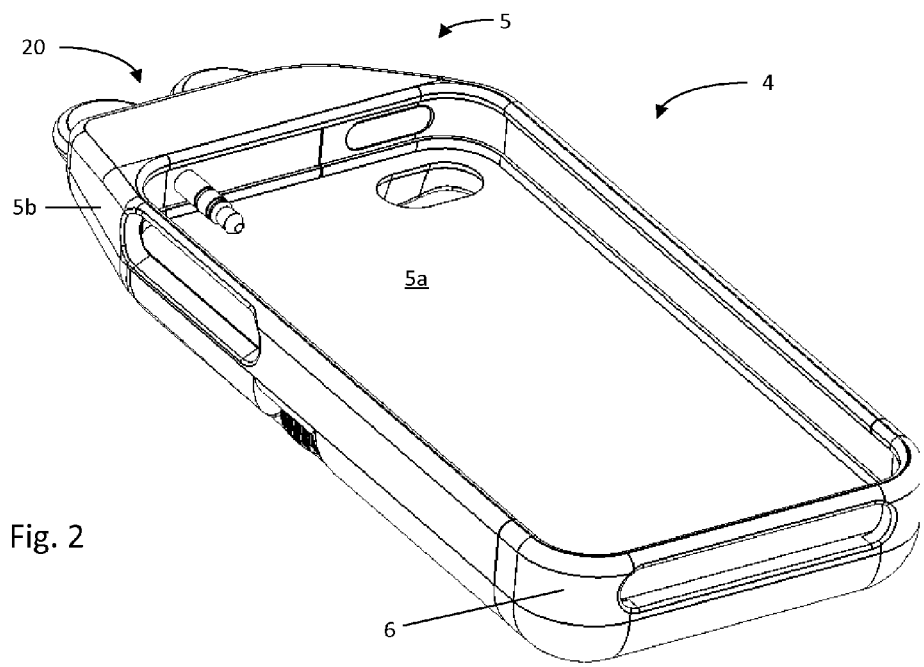
FIG. 2 is a perspective view of a case including a retraction device according to an exemplary embodiment.

According to an exemplary embodiment, the upper portion 5 of the case 4 is configured to slide onto the portable media device 2 and the lower portion 6 is configured to slide onto an opposite end of the portable media device 2 so as to couple to the upper portion 5 and retain the case 4 on the portable media player 2. As shown in FIG. 2, the connector 7 is provided in the upper portion 5 of the case 4 and is configured to couple directly to the port of the portable media device 2 as the upper portion 5 is slid onto the portable media device 2. The lower portion 6 includes an aperture to provide access to a data port of the phone, so as to allow charging or data transfer with a data card.

According to the exemplary embodiment shown in FIG. 13-16, a connector 7a is permanently coupled to the cord 22 and is provided at a lower end of the upper portion 5 of the case 4. The lower portion 6 of the case includes a second and third data connectors 7b, 7c, the second data connector 7b being configured to releasably couple or connect to the first connector 7a and the third data connector 7c being configured to releasably couple or connect to the port 2a of the portable media player 2. A fourth data connector (not shown) is permanently connected to each of the second and third data connectors 7b, 7c and is configured to releasably couple or connect to an external data cord, such that other functions of the data port of the portable media player 2 may be utilized with a separate data cord (e.g., media transfer, charging, etc.) without removing the case 4.

According to an exemplary embodiment, the case 4 is configured for the cord 22 to extend from the upper portion 5 of the case 4. For example, the upper portion 5 of the case 4 may include one or more recesses for retaining the speakers 24a, 24b generally therein. Furthermore, the upper portion 5 of the case 4 may be configured to retain the speakers 24a, 24b in a position and orientation, such that the speakers do not add to the combined thickness of the portable media player 2 and the case 4.

According to an exemplary embodiment, the refraction wheel 56 is configured to allow a user to push or pop out the speakers 24a, 24b from the recess of the upper portion 5 of the case 4. For example, stiffness or rigidity of the cord 22 may be sufficient for the outer winding 23b to push the speaker 24a, 24b out of the recess. Instead, or additionally, the retraction wheel 56 may positively engage a portion of the speakers 24a, 24b so as to directly push the speakers 24a, 24b out of the recesses.

According to an exemplary embodiment, the various components of the retraction device 10 and the case 4 are injection molded plastic components that are assembled using conventional threaded fasteners. According to other exemplary embodiments, the retraction device 10, case 4, and their various components may be made and assembled in other manners including, for example, by utilizing other materials (e.g., other polymeric or elastomeric materials, metals, composites, combinations thereof, etc.), other manufacturing methods (e.g., extrusion, 3D printing, compression molding, casting, stamping, etc.), other assembly methods (e.g., other fasteners, adhesives, tolerance fit, integral positive engagement features, etc.), alone or in any suitable combination with each other considering the function and use of each component.

Referring to FIGS. 19-32, according to another exemplary embodiment, a case 104 for a portable media player 2 (e.g., phone) is configured as a headset refractor. The case 104 generally includes a headset 120, a base 130 (e.g., structure, frame, chassis, etc.), and a retractor mechanism disposed inside the base 130. The base generally includes an upper portion 130a and a lower portion 130b. The retractor mechanism generally includes an arbor 140 (e.g., spool, etc.), spring 150 (e.g., coiled clock or power spring), and locking or latching member 160.

According to an exemplary embodiment, the headset 20 is configured as described previously, including a continuous, uninterrupted wired connection between the speakers 24a, 24b and a connector 7 (e.g., a headphone jack, male plug, etc.) configured to couple to the portable media player 2. For example, the electrical connection between the speakers 24a, 24b and the connector 7 does not include sliding contacts but instead utilizes only hard-wired or fixed connections between various components (e.g., between the cord 22 and speakers 24a, 24b, between the cord 22 and the connector 7, or between any other intervening components).

Figures 19, 20:
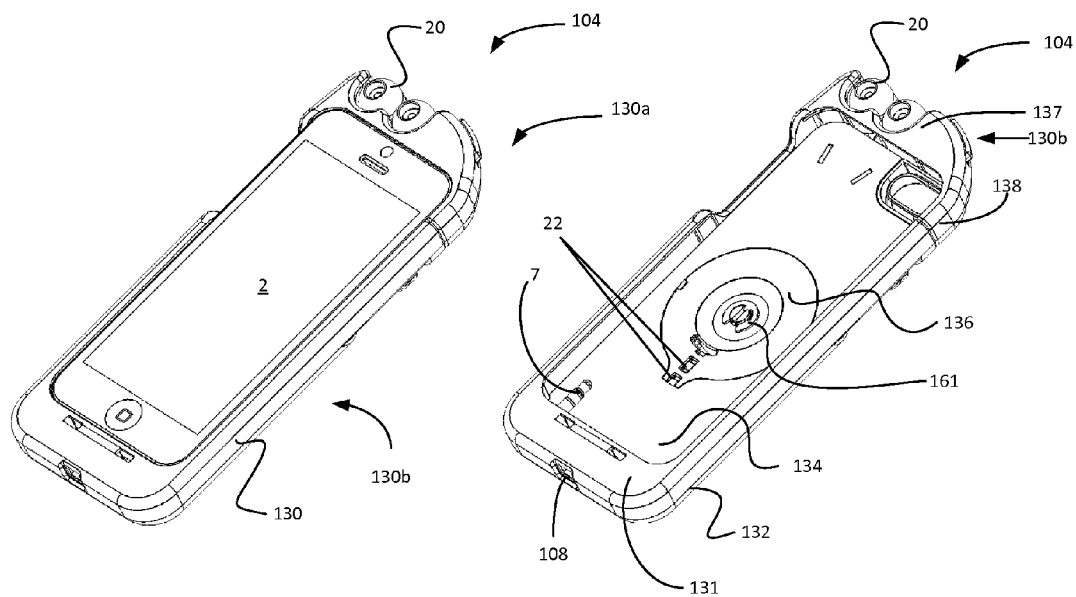
FIG. 19 is a perspective view of a portable media player and a case with a retraction device according to an exemplary embodiment.
FIG. 20 is a perspective view of the case as shown in FIG. 19.
Figures 21, 22:
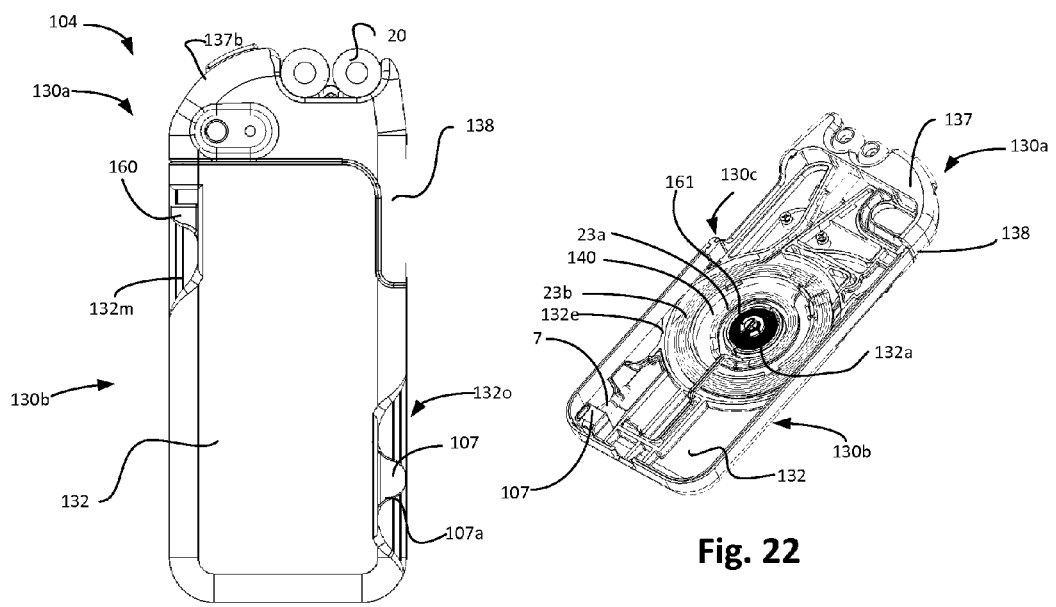
FIG. 21 is a rear plan view of the case as shown in FIG. 19.
FIG. 22 is a partial perspective view of the case as shown in FIG. 19.

As shown in FIGS. 19-21, according to an exemplary embodiment, the upper portion 130a of the base 130 is configured to couple the lower portion 130b, so as to generally surround a periphery of the portable media player 2, substantially cover a rear surface of the portable media player 2, and leave exposed a forward display of the portable media player 2. For example, as shown in FIGS. 22-23, the upper portion 130a may releasably couple to the lower portion 130b through the use of integrally formed positive engagement features 130c (e.g., complementary tabs, hooks, clips, protrusions, apertures, recesses, etc.) of the upper portion 130a and lower portion 130b, tolerance fit, fasteners, and the like.

Figures 24A, 24B:
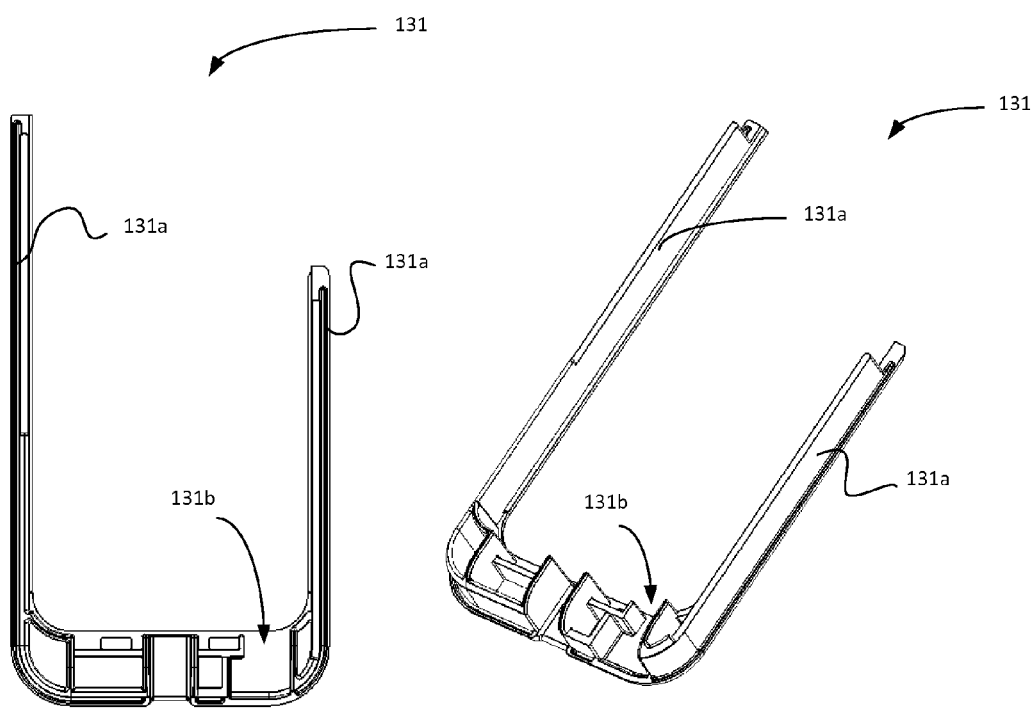
FIG. 24A is a perspective view of a forward body component of the case as shown in FIG. 19.
FIG. 24B is a front plan view of a forward body component of the case as shown in FIG. 19.

As shown in FIG. 20, according to an exemplary embodiment, the lower portion 130b of the base 130 includes a forward body 131 (e.g., cover, portion, member, casing, etc.) and a rearward body 132 (e.g., cover, chassis, portion, member, casing etc.) that are coupled together, for example, with positive engagement features, tolerance fit, fasteners, adhesives, and the like. The forward body 131 forms a forward-most surface of the case 104 (i.e., adjacent to and/or surrounding a display of the portable media player 2), while the rearward body 132 forms the lateral and rearmost surfaces of the case 104. For example, as shown in FIGS. 24A and 24B, the forward body 131 may include a peripheral flange 131a configured to tightly engage outer sides of the portable media player 2 and which extends into the rearward body 132.

Figure 25:
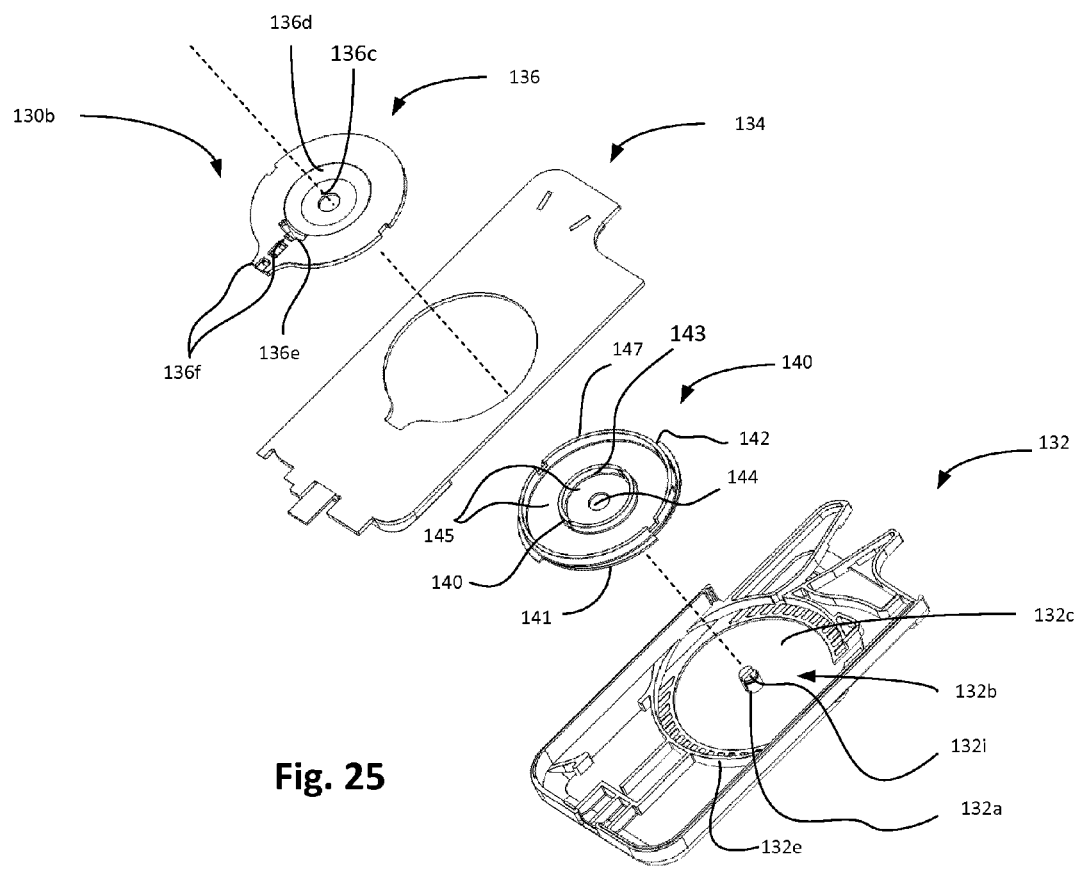
FIG. 25 is a partial exploded view of the case as shown in FIG. 19 taken from a front perspective.
Figure 26:
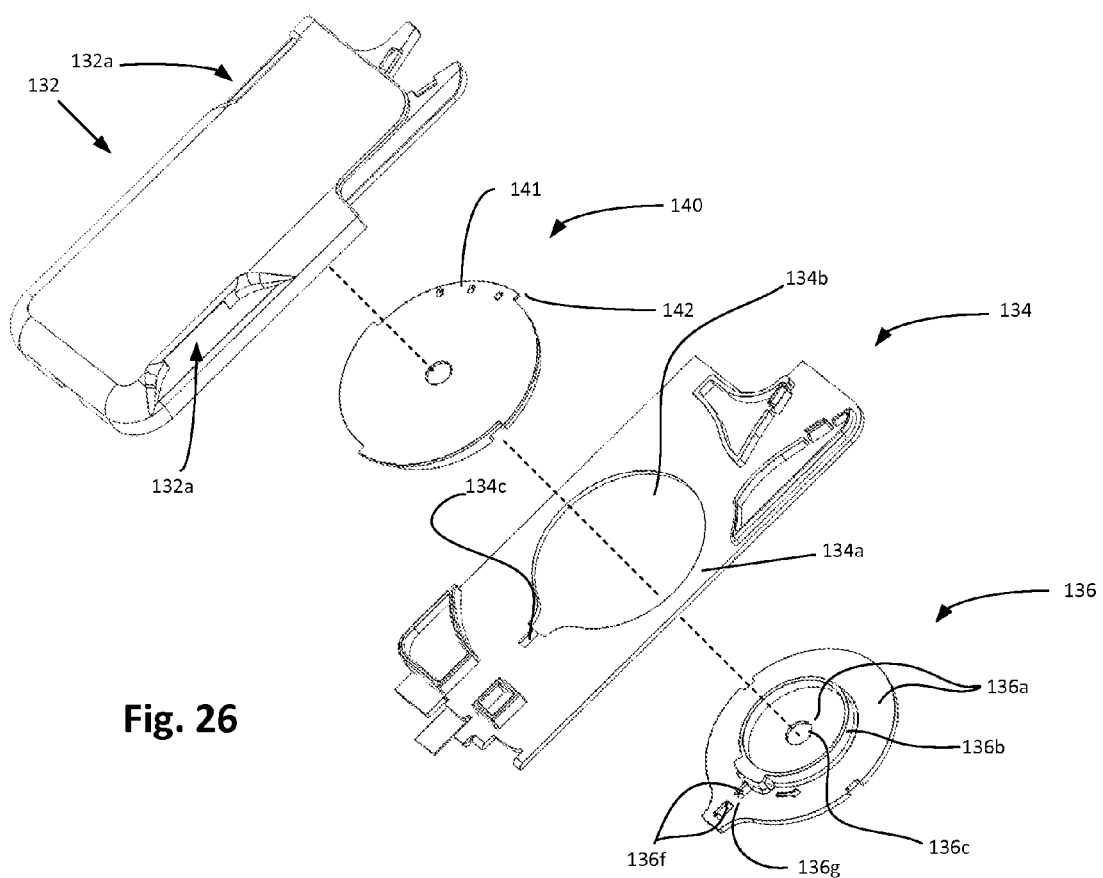
FIG. 26 is a partial exploded view of the case as shown in FIG. 19 taken from a rear perspective.

As shown in FIGS. 20 and 25-26, according to an exemplary embodiment, the lower portion 130b of the base further includes an inner cover 134 (e.g., plate, portion, member, etc.) and a spring cover 136 (e.g., base, portion, plate, member, etc.). Generally speaking, the rearward body 132 is the portion of the case 104 that forms the main body (e.g., chassis, structure, etc.) of the case 104. The inner cover 134 and the spring cover 136 are cooperatively configured with the rearward body 132 to define a cavity therebetween that contains internal components of the headset retractor inside the case 104.

As shown in FIGS. 22, 23, 25, and 28, according to an exemplary embodiment, the rearward body 132 includes an annular flange 132e, which defines a recess or cavity 132f in which the arbor 140 and spring 150 are generally positioned and in which wound portions of the cord 22 may be positioned. The rearward body 132 further includes a central circular male member or post 132a.

Figure 27:
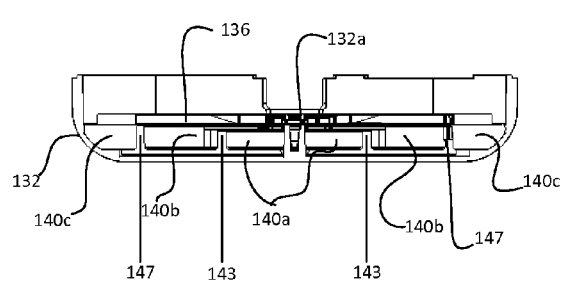
FIG. 27 is a partial cross-sectional view of the case taken from Line 27-27 in FIG. 23.
Figure 28:
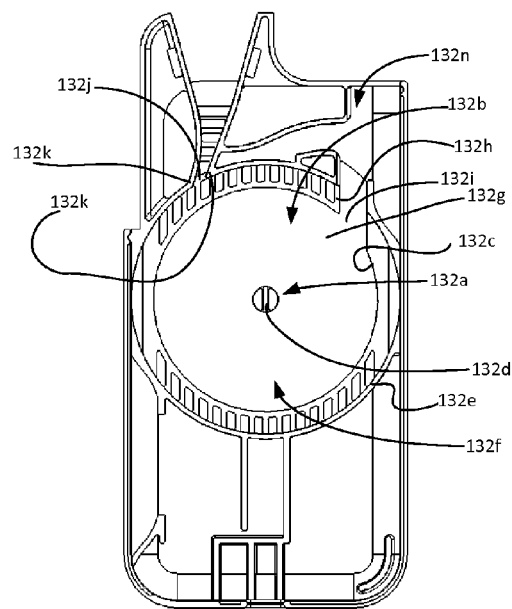
FIG. 28 is a front plan view of a rear body component of the case as shown in FIG. 19.
Figure 29A:
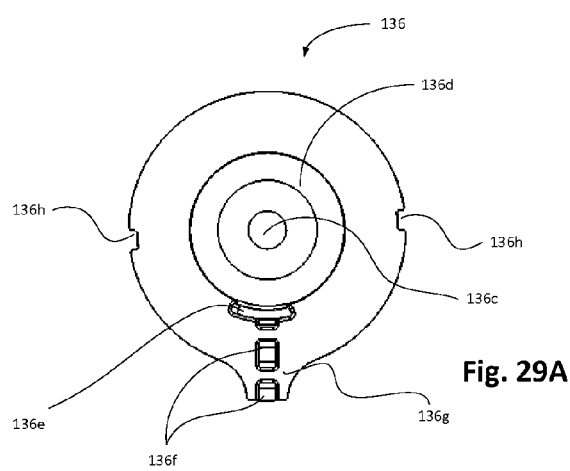
FIG. 29A is a front plan view of a spring cover component of the case as shown in FIG. 19.
Figure 29B:
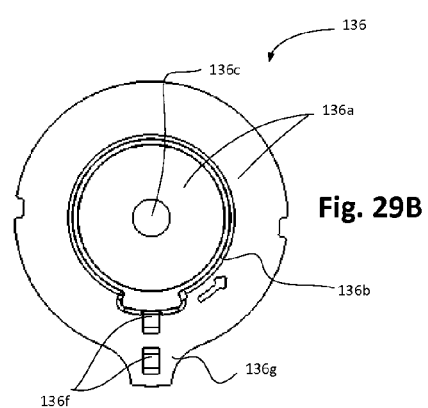
FIG. 29B is a rear plan view of a spring cover component of the case as shown in FIG. 19.

As shown in FIGS. 20 and 27, according to an exemplary embodiment, the spring cover 136 is configured to couple to the rearward body 132 so as to enclose at least a portion of the cavity 132f defined by the flange 132e of the rearward body 132. The spring cover 136 may, for example, have a generally circular shape with a generally planar inner surface 136a that opposes an inner planar surface 132g of the rearward body 132 (see also in FIGS. 25, 26, and 29A-29B). The spring cover 136 includes a central aperture 136c that is configured to receive the central post 132a of the rearward body 132. The post 132a further includes an annular groove 132i that is configured to receive a clip or fastener 161 (e.g., C-clip, E-clip, or similar) to couple the spring cover 136 to the rearward body 132 and/or to prevent axial separation or movement of the spring cover 136 away from the rearward body 132 (see also FIGS. 20 and 25). According to other exemplary embodiments, the spring cover 136 may be coupled to the rearward body 132 in other manners, including threaded fasteners, integral positive engagement features, and the like.

As shown in FIGS. 25 and 28A, according to an exemplary embodiment, the spring cover 136 may also include a recess or indentation 136d. The recess 136d provides space to accommodate a depth or thickness of the clip 161 and an upper portion of the post 132a above the annular 132i, such that an outermost portion of the post 132a is coplanar with or does not extend outward of an outermost surface of the spring cover 136. The recess 136d is generally coaxial with the aperture 136c and/or the inner flange 143 of the arbor 140. The recess 136d also extends into the innermost cavity 140a in which the spring 150 is disposed as described in further detail below.

As shown in FIGS. 20 and 25-26, according to an exemplary embodiment, the inner cover 134 is configured to couple to the rearward body 132 so as to generally enclose the remaining interior portions of the rearward body 132 (i.e., areas not enclosed by the spring cover 136), for example, in the regions radially outward of the spring cover 136. The inner cover 134 may be generally planar and may include a central aperture 134b corresponding in shape to an outer periphery of the spring cover 136. Configured in this manner, the central aperture 134b receives the spring cover 136 therein, such that outer surfaces of the inner cover 134 and spring cover 136 are generally coplanar.

According to an exemplary embodiment, the inner cover 134 may be coupled to the rearward body 132 with integrally formed clips, tabs, recesses, ledges, or other positive engagement features cooperatively configured to engage corresponding features of the rearward body 132. Instead or additionally, the inner cover 134 may be coupled to the rearward body 132 with the use of separate fasteners (e.g., threaded fasteners, pins, clips, etc.), adhesives, or any other suitable manner.

According to an exemplary embodiment, the forward body 131, rearward body 132, inner cover 134, and spring cover 136 are each injection molded plastic components. According to other exemplary embodiments, the forward body 131, rearward body 132, inner cover 134, and spring cover 136 may be formed according to other methods (e.g., other molding processes, stamping, 3D printing, etc.), be formed of different materials (e.g., metal, polymer, composites, natural materials, etc. being the same or different for each such component), and the like.

It should be noted that while the various components of the lower portion 130b of the base 130 (e.g., the forward body 131, rearward body 132, inner cover 134, and spring cover 136) are depicted and described as separate, unitary (i.e., single-piece) components, it is contemplated that the lower portion 130b, or components providing similar functionality, may be provided in different manners (e.g., combining multiple components into a single component, dividing each individual component into multiple components, or providing other combinations of components).

According to an exemplary embodiment, a refractor mechanism is provided inside the cavity of the lower portion 130b of the base 130. As shown in FIGS. 22-23, the refractor mechanism generally includes the arbor 140, spring 150, and locking member 160. The arbor 140 is configured to rotate within the base 130 for the cord 22 to wind therearound and unwind therefrom. The spring 150 is configured to apply a torque to the arbor, so as to retract or wind the cord 22 into the base 130 as described previously. The locking member 160 is configured to engage the arbor 140 to provide selective retraction of the cord 22.

According to an exemplary embodiment, the base 130 and the arbor 140 are cooperatively configured for the arbor 140 to rotate relative to the base 130 for the cord 22 to wind into and unwind out of the case 104. For example, the central post 132a of the rearward body 132 of the base 130 defines an axis of rotation, and the arbor 140 includes a central aperture 144 configured to receive the central post 132a for the arbor 140 to rotate about the central post 132a. The rear body 132 may further include a recess 132b defined by a generally circular or annular step or flange 132c, which is configured to receive an outer periphery 141 (e.g., with gradually sloping teeth 142) of the arbor 140 therein (see also FIGS. 25-28 and 30). The recess 132b may have a depth approximately equal to the height of the outer periphery 141 or teeth 142 of the arbor 140.

As shown in FIGS. 23 and 23B, according to an exemplary embodiment, the spring 150 is configured to couple to the base 130 and the arbor 140 to apply a torque to and cause rotation of the arbor 140. The post 132a is configured to couple to an inner end 151 of the spring 150, for example, having an axial slot 132d configured to receive an inner bent end 151 of the spring 150 (e.g., extending radially inward) therein. The arbor 140 includes an inner generally circular or annular flange 143 extending away from a surface 145 (e.g., planar surface) thereof, which defines a central recess or cavity 140a in which an inner winding of the spring 150 is generally positioned. The cavity 140a extends in a radial direction generally between post 132a of the outer cover 130 and the inner annular flange 143 of the arbor 140, and extends in an axial direction generally between the planar surface 145 of the arbor 140 and an opposing, generally planar surface 136a of the spring cover 136. The annular flange 143 further includes two or more slots 146 configured to receive an outer bent end 152 of the spring 150 therein.

According to an exemplary embodiment, the outer end 152 of the spring 150 is configured to wrap around and/or tightly interfit the flange 143 of the arbor 140. For example, the outer end 152 of the spring is configured to extend through the slots 146 of the flange 143. At an outermost portion of an inner winding of the spring 150, the spring jogs or bends radially outward. For example, a first jog or segment 153 extends directly away from a central axis of the spring 150 a distance approximately equal to a thickness of the flange 143 of the arbor 140. At an end of the first jog or segment 153, the spring 150 bends radially inward. For example, an annular or outer segment 154 extends in the direction in which the inner winding of the spring 150 is wound. The annular segment 154 may, for example, extend approximately 180 degrees, or another distance approximately equal to that of an outer portion of a segment 143a of flange 143. At an end of the annular segment 154, the spring 150 jogs or bends radially inward. For example, a second jog or segment 155 extends directly toward the central axis of the spring 150 a distance approximately equal to the thickness of the flange 143 of the arbor 140. At an end of the second jog 155, the spring 150 bends radially outward. For example, an inner annular segment 156 extends in a direction opposite that of the inner winding of the spring 150. The inner annular segment 156 may, for example, extend a distance greater than that of the second jog 155 but less than that of the outer annular segment 154.

According to an exemplary embodiment, the first jog 153 is configured to be received within a first of the slots 146 of the flange 143 of the arbor 140, and the second jog 155 is configured to be received with a second of the slots 146. Because the outer annular segment 154 has a length generally the same as that of the first portion or segment 143a of the flange 143, the first portion 143a of the flange 143 may be held tightly between the first jog 153 and second jog 155 of the outer end 152 of the spring 150. Further, because the length of the second jog 155 is generally the same as that of the thickness of the flange 143, the flange 143 may be held tightly between the outer annular segment 154 and the inner annular segment 156 of the outer end 152 of the spring 150. Additionally, the outer annular segment 154 may be configured with a natural radius of curvature (i.e., in a relaxed stated) that is greater than the radius of an outer surface of the flange 143, so as to bend or force the inner annular segment 156 outward and against an inner surface of the flange 143.

Configured in this manner, the spring 150 may tightly couple to the arbor 140, so as to prevent axial movement of the spring 150 (e.g., the outer end 152), which might otherwise engage or rub against other components of the case 104, such as the spring cover 136, and hinder rotation of the arbor 140 and retraction of the cord 22.

According to an exemplary embodiment, the arbor 140 is configured to rotate relative to the base 130, so as to wind and unwind the cord 22 from the case 104. More particularly, as shown in FIGS. 22-23, the base 130 and the arbor 140 are configured to wrap the cord 22 to form the inner winding 23a and outer winding 23b, which advantageously enable a continuous, uninterrupted wired connection between the speakers 24a, 24b and connector 7, as described previously.

According to an exemplary embodiment, the inner winding 23a is positioned in an intermediate cavity 140b extending radially generally between an annular flange 136b of the spring cover 136 and an outer flange 147 of the arbor 140, which extends away from the planar surface 145 of the arbor 140 (see also FIG. 27). The flange 136b of the spring cover 136 is disposed adjacent to and radially outward of the inner flange 143 of the arbor 140. The cavity 140b extends in an axial direction generally between the planar surface 145 of the arbor 140 and the opposing planar surface 136a of the spring cover 136. A depth of the cavity 140b is configured such that the inner winding 23a of the cord 22 is wound only in a single plane. For example, the depth of the cavity 140b (i.e., the distance between the planar surface 145 of the arbor and the opposing planar surface of 136a of the spring cover 136) may, for example, be configured according to the major and minor dimensions of the cord 22 as described previously.

According to an exemplary embodiment, the outer winding 23b is positioned in an outer cavity 140c that extends radially generally between the outer flange 147 of the arbor 140 and an annular flange 132e of the rearward body 132 of the base 130. The cavity 140c extends axially generally between a generally planar surface 132h of the rearward body 132 and an opposing generally planar surface 134a of the inner cover 134 of the base 130. It should be noted that the planar surface 132h is defined by the peaks or outermost portions of several bosses or protrusions of the rearward body 132. A depth of the cavity 140c is configured such that the outer winding 23b of the cord 22 (i.e., the retractable portion of the cord 22 that may be pulled out of the case 104) is wound only in a single plane. For example, the depth of the cavity 140c (i.e., the distance between the planar surface 132h of the outer cover and the planar face 134a of the inner cover) may, for example, be configured according to the major and minor dimensions of the cord 22 as described previously.

Configured in this manner, the cavities 140a, 140b, and 140c are both generally coaxial and coplanar, which as described previously, allows for the spring 150, inner winding 23a of the cord 22, and outer winding 23b of the cord 22 to also be generally coaxial (see FIG. 23) and coplanar (see FIG. 27). For example, a single plane may extend through each successive revolution of the cord 22 in the inner and outer windings 23a, 23b and through each successive revolution of the spring 150. Advantageously, this coaxial, coplanar relationship of the inner and outer windings 23a, 23b of the cord 22 and the spring 150 may provide for a thin case 104 by minimizing the number of case 104 components in a layered relationship.

Figure 34:
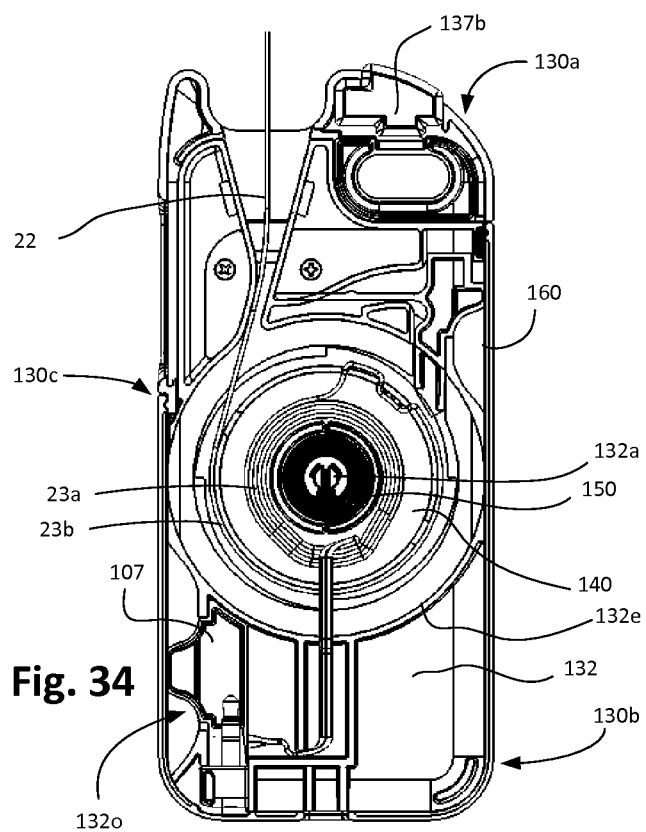
FIG. 34 is a partial front plan view of the case as shown in FIG. 19 with the cord in an extended state.

As shown in FIGS. 20, 22-23, and 34, according to an exemplary embodiment, the cord 22 is fixedly coupled to the arbor 140, which rotates, and to the base 130 (e.g., spring cover 134), which is stationary, so as to wind and unwind the cord 22 about the arbor 140 as generally depicted in FIGS. 18A-18E (also shown fully retracted in FIG. 23, and extended in FIG. 34). For example, a portion of the cord 22 between the inner winding 23a and outer winding 23b (or retractable portion of the cord 22) is coupled the outer annular flange 147 of the arbor 140. For example, the annular flange 147 may include one slot 148 in which the cord 22 is positioned and held, or a series of slots 148 through which the cord 22 is woven in a serpentine manner. The slot or slots 148 is configured allow the cord 22 to pass from the cavity 140b to the outer cavity 140c in the same plane as the inner and outer windings 23a, 23b (e.g., similar to FIG. 5 with cord 22 extending through slots 48a of flange 48 of arbor 40).

As shown in FIGS. 25-26 and 29A-29B, according to an exemplary embodiment, the spring cover 136 includes an aperture 136e and a channel 136f, which are cooperatively configured both to couple the cord 22 to the spring cover 136 and to allow the cord 22 to pass from the inner winding 23a in the intermediate cavity 140b across the outer winding 23b in the outer cavity 140c and past the outer flange 132e of the rearward body 132 to be coupled to the connector 7. The channel 136f of the spring cover 136 is configured to tightly fight the cord 22 therein, for example, such that the minor dimension of the cord 22 extends in an axial direction (i.e., relative to the post 132a or axis of rotation). Furthermore, while the outer periphery of the spring cover 136 may be generally coextensive with the outer flange 147 of the arbor 140, the spring cover 136 may include an extension 136g in which the channel 136f is formed and which extends to be at least coextensive with the outer flange 132e of the rearward body 132. The inner cover 134 may also include a channel or slot 134c configured to receive the cord 22 therein. Alternatively, the extension 136g of the spring cover 136 and channel 136f may be cooperatively configured with the slot 134c of the inner cover 134 for the cord 22 to extend past the outer flange 132e of the rearward body 132. Additionally, the channel 136f may be defined by two opposing segments of the extension 136g that are disconnected in regions of the aperture 136e and the channel 136f (e.g., with a slit or cut therethrough), such that the cord 22 may be positioned in the aperture 136e and the channel 136f through the slit or cut without requiring an end of the cord 22 to be threaded through the aperture 136e. The decoupling the extension 136g about the aperture 136e and channel 136f advantageously allows for a completed headset 20 (i.e., already coupled to a connector 7 and speakers 24a, 24b that are bigger than the aperture 136e) to be used with the refraction device, as opposed to connecting an end of the cord 22 to the connector 7 or speakers 24a, 24b after being threaded through the aperture 136e (e.g., by soldering).

Configured in this manner (i.e., with the minor dimension extending in the axial direction as it passes from the inner winding 23a to the connector 7) and/or with the cord 22 being positioned in recessed channels 136f and/or 134c, the overall thickness of the case 104 minimized while still providing a continuous, hard-wired connection between the connector 7 and the speakers 24a, 24b.

As described above, the rearward body 132, arbor 140, cord 22, and spring cover 136, along with the inner cover 34 and spring 150, are configured to minimize the layers of components between a rear surface of the portable media player and a rear surface of the case. For example, as shown in FIG. 27, at the thickest point of the case 104, starting from the rear surface of the portable media player 2, are layered a planar portion of the spring cover 136 (i.e., the channel 1360, the cord 22 passing from the inner winding 23a to the connector 7 (e.g., with the minor dimension in the axial or thickness direction), the cord 22 forming the inner or outer winding 23a, 23b (e.g., with a major dimension in the axial or thickness direction), a planar portion of the arbor 140, and a planar portion of the rearward body 132. That is, for a completely enclosed retractor mechanism having a hard-wired connection between a connector 7 and speakers 24a, 24b, the thickness of the case 104 (i.e., distance of the case extending in a normal direction away from a rear surface of the portable media player) consists essentially of three rigid, planar components (e.g., the spring cover 136, arbor 140, and rearward body 132), and the cavity in which the cord 22 is wound in a single plane (or a first width or thickness of the cord 22 (e.g., a planar winding of the cord 22, for example, in the major dimension), and a second width or thickness of the cord 22 (e.g., a linear extension of the cord 22, for example, in the minor dimension)), as well as tolerances or clearances therebetween. For example, the thickness of the case 104 in the region of the retraction device may be less than approximately 8 mm (e.g., less than or equal to approximately 6 mm).

According to an exemplary embodiment, the retractable portion of the cord 22 is configured to wind around the outer flange 147 of the arbor 140 to form the outer winding 23b. As described above, the outer winding 23b is configured to be wound generally in a single plane (i.e., such that a single plane extends through each revolution of the cord 22, and/or such that adjacent revolutions of the cord 22 generally do not overlap each other, and/or such that successive revolutions are generally concentric and/or generally arranged radially outward or inward of each other).

According to an exemplary embodiment, the cord 22 is configured to wind about the outer flange 147 with the major dimension of the cord 22 extending primarily in an axial direction (i.e., relative to an axis of rotation of the arbor 140). For example, as shown in FIGS. 23 and 23b, the rearward body 132 includes an opening or channel 132j through which the retractable portion of the cord 22 enters the cavity 132f to be wound around the arbor 140. The opening 132j extends through the outer flange 132e and may, for example, be defined between opposing members 132k (e.g., bosses, protrusions, etc.). The opening 132j may have a width (i.e., extending in a tangential direction to the flange 132e) that is less than approximately 0.75 (e.g., less than or equal to approximately 0.66) times the major dimension of the cord 22 and is greater than approximately 1.5 (e.g., greater than or equal to approximately 2) times the minor dimension of the cord 22. The spacing between the members 132k allows the members 132k to guide or rotate the cord 22 such that its major dimension is oriented in a generally axial direction (i.e., relative to rotation of the arbor 140) as the cord 22 enters into the outer cavity 140f (and cavity 132f) to be wound around the outer flange 147 of the arbor 140. The members 132k may also gradually taper closer together, for example, by having a wider spacing nearer an entrance of the case 104 than the opening 132j.

According to an exemplary embodiment, the headset 20 further includes an input device (not shown) (e.g., microphone, or buttons/switches for controlling the portable media player 2), and/or a coupling component (e.g., member, structure, overmold, etc. of the cord 22 that prevents unintended or further separation of conductors 22a, 22b) that is coupled to the retractable portion of the cord 22 and which has one or more greater dimensions than the cord 22. The members 132k may further be configured such that the opening 132j has a width that accommodates the greater dimension of the input devices and/or coupling component (e.g., less than approximately 1.0 times the major dimension of the cord 22 and/or greater than approximately 3.0 times the minor dimension of the cord 22) and/or such that at least one of the members 132k elastically deflects away from the other member 132 as the input devices and/or coupling component passes through the opening 132j (i.e., as the cord 22 is extracted form or retracted into the case 104).

Figure 31:
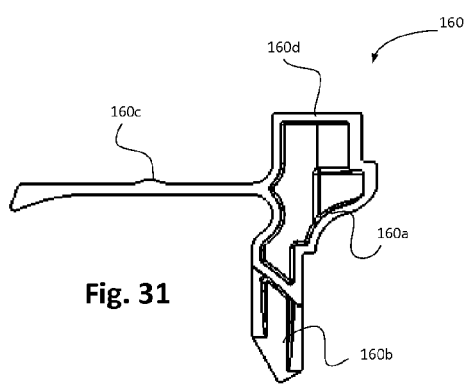
FIG. 31 is a front plan view of a locking member of the case as shown in FIG. 19.

As shown in FIGS. 22, 23, and 31, according to an exemplary embodiment, the retraction mechanism includes a locking member 160 that is configured to engage the arbor 140 to provide selective retraction of the cord 22. The locking member 160 generally includes an interface portion 160a, an engagement portion 160b, a spring portion 160c, and a guide portion 160d.

According to an exemplary embodiment, the locking portion 160b is configured to allow a user to pull or extract the cord 22 in opposition to resistance generally only from the spring 150, and to prevent rotation of the arbor 140 to maintain the cord 22 in an extended state. According to an exemplary embodiment, the locking portion 160b includes an inner surface that extends generally in a tangential direction relative to the outer periphery 141 of the arbor 140. As the cord 22 is pulled or extracted from the case 104 against the torsion from the spring 150, the arbor 140 is rotated and the outer periphery 141 slides against the inner surface of the locking portion 160b of the locking member 160. After the cord 22 is no longer pulled, the spring 150 rotates the arbor 140 in a direction opposite that during extraction of the cord 22. The torsion forces a stepped portion or radially extending surface of the tooth 142 against a stepped end (e.g., radially extending surface) of the locking portion 160a of the locking member 160, so as to prevent further rotation of the arbor 140.

According to an exemplary embodiment, the locking portion 160b is configured to be positioned and slide between the outer winding 23b of the cord 22 and the rearward body 132. For example, the rearward body 132 may include a slot 132l in the outer planar surface 132h in which the locking portion 160b may slide. The slot or channel 132l and the locking portion 160b may be cooperatively configured (e.g., with corresponding depth and thickness), such that an upper surface of the locking portion 160b is generally coplanar with the planar surface 132h on either of the slot or channel 132l and/or the planar surface 145 of the arbor 140.

Configured in this manner (i.e., by having the locking portion 160b extend under the outer winding 23b, engage an outer periphery of the arbor 140, and be generally coplanar with the planar surface 132h of the rearward body 132 and/or the planar surface 145 of the arbor 140), provision of a locking member 160 or mechanism does not add to a thickness of the case 104.

According to an exemplary embodiment, the spring portion 160c is configured to normally bias the locking member 160 against the teeth 142 of the arbor 140. For example, the spring portion 160c may be an elongated elastic member extending in at least a partially normal direction relative to the locking portion 160b. The spring portion 160c may, for example, be held between two portions of the rearward body 132 (e.g., between bosses, protrusions, in a slot thereof, etc.).

According to an exemplary embodiment, the interface portion 160a is configured to actuated (e.g., pushed, pressed, moved, etc.) by a user in a direction opposite the normal bias of the spring portion 160c, so as to selectively move the locking portion 160b out of engagement with the teeth 142 of the arbor 140. When the locking portion 160b is moved out of engagement with the arbor 140, torque applied by the spring 150 causes the arbor 140 to rotate, thereby retracting the retractable portion of the cord 22 into the housing 104 to be wound about the arbor 140 (i.e., forming the outer winding 23b). The rearward body 132 may include an access hole or aperture 132m through which the interface portion 160a protrudes for access by a user.

According to an exemplary embodiment, a guide portion 160d of the locking member 160 is configured to slide within a slot 132n of the rearward body 132. The interface between the guide portion 160d and the slot 132n help ensure that the locking member 160 slides consistently in a repeatable path (e.g., in a generally tangential direction relative to the outer periphery 141 of the arbor 140).

According to an exemplary embodiment, the locking member 160 is a unitary (i.e., single piece) component. For example, the locking member 160 may be an injection molded plastic piece. According to other exemplary embodiments, the locking member 160 may include more components, be made from other processes (e.g., 3D printing, stamping, etc.), be made from other materials (e.g., metals, etc.), and the like.

According to an exemplary embodiment, the connector 7 is configured to removably couple to or be inserted into the portable media player 2. For example, the connect 7 may be movable relative to other portions of the case 104, such that the connector 7 may move toward or away from the portable media player 2 to be coupled thereto (e.g., inserted into or retracted from a female connector or port of the portable media player 2).

As shown in FIGS. 21-23, according to an exemplary embodiment, the connector 7 is coupled to a slide member 107. The slide member 107 resides generally within a cavity defined between the forward body 131 and rearward body 132 below the portable media player 2 (see also FIGS. 24A-24B). The slide member 107 is configured to be guided by and slide within a channel or slot 131b defined by the forward body 131. The slide member 107 may, for example, be configured to slide only a short distance (e.g., approximately 1.75 mm) to move the connector 7 (e.g., a standard ⅛" audio plug) into and out of electrical connection with the port (e.g., standard ⅛" audio jack) of the portable media player 2. By enabling the connector 7 to be disconnected from the portable media player 2, functions of the portable media player 2 that are automated or switched when a connector 7 is connected (e.g., turning off a ringer or speaker of the portable media player 2) may be bypassed without fully removing the case 104 or connector 7 from the portable media player 2. According to other exemplary embodiments, as described above, the connector 7 may be configured to couple to a data port (e.g., 30-pin connector, Lighting® jack, USB port, etc.), while software program (e.g., application) may maintain normal function (e.g., with audible speaker or ringer) and not output sound to the speakers 24a, 24b.

According to an exemplary embodiment, the slide member 107 includes an interface portion 107a that a user may push generally upward or downward to cause the connector 7 to connect or disconnect from the portable media player 2. The interface portion 107a may, for example, protrude through or otherwise be accessible through an aperture or hole 132o in a lower portion of the rearward body 132.

According to an exemplary embodiment, the slide member 107 is a unitary (i.e., single-piece) injection molded, plastic member to which the connector 7 is fixedly coupled. According to other exemplary embodiments the slide member 107 may be a multi-piece assembly, may be made from other materials (e.g., metal), and/or made according to other methods (e.g., stamping, etc.).

According to an exemplary embodiment, the forward and rearward covers 131, 132 further define a recess or access hole 108 providing access to a female connector or port (e.g., data, charging, etc.) of the portable media player 2.

Figure 32:
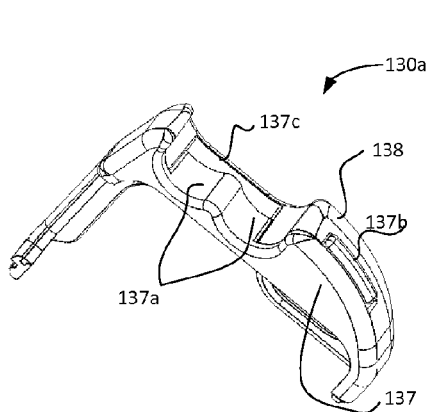
FIG. 32 is a partial perspective view of the case as shown in FIG. 19.
Figure 33:
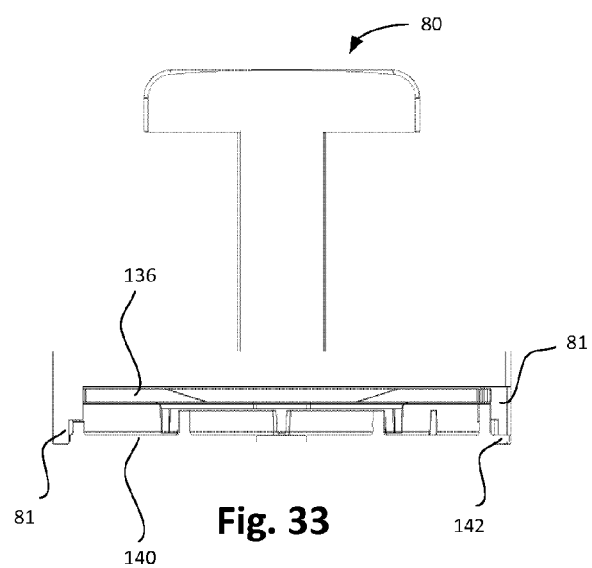
FIG. 33 is a cross-sectional view of a winding tool and a spring cover component and an arbor component of the case as shown in FIG. 19.

As shown in FIGS. 20 and 32, according to an exemplary embodiment, the upper portion 130a of the base 130 generally includes a forward body 137 and a rearward body 138. The forward body 137 and rearward body 138 are coupled to each other, for example, with complementary positive engagement features, fasteners, adhesives, and the like. The upper portion 130a of the base 130 defines one or more recesses 137a configured to receive the speakers 24a, 24b therein and includes a button 137b for operation or pressing of a top-mounted button (e.g., power button) of the portable media player 2. The button 137b is positioned within a cavity defined between the forward body 137 and the rearward body 138 and is configured to tightly engage the button of the portable media player 2. An interface portion of the button 137b extends through an aperture or hole defined by and/or between the forward body 137 and the rearward body 138.

According to an exemplary embodiment, the button 137b is a rigid (e.g., an injection molded plastic) component. Use of a rigid button 137b is particularly advantageous due to the extended distance between a top end of the case 104 (i.e., due to the recesses 137a for receiving the speakers 24a, 24b) in order to transfer force from a user pressing the button 137b to the button of the portable media player 2. This is in contrast to the compliant members or buttons (e.g., rubber, silicone, etc.) for conventional cases whose uppermost ends are in close proximity to top-mounted buttons of the respective portable media players 2.

According to an exemplary embodiment, the upper portion 130a of the base 130 defines an aperture 137c through which the cord 22 of the headset 20 extends. The aperture 137c is shaped and sized such that the speakers 24a, 24b cannot be pulled through the aperture 137c. Advantageously, the upper portion 130a of the base 130 is thus retained to the remainder of the case 104, for example, to prevent separation and/or loss of the upper portion 130a of the base 130 when the case 104 is removed from the portable media player 2.

According to an exemplary embodiment, to assemble the retraction mechanism the spring 150 is coupled to the arbor 140. In a relaxed state, the spring 150 is positioned substantially in the cavity 140a inward of the inner flange 143, and the outer end 152 of the spring 150 is coupled to the inner flange 143. More particularly, the jogs or segments 153, 155 of the spring 150 are positioned in the slots 146 of the inner flange 143, the annular segment 154 is placed outward of the segment 143a of the flange 143, and the inner annular segment 156 is positioned inward of the segment 143a to couple the outer end 152 of the spring 150 to the arbor 140.

According to an exemplary embodiment, the locking member 160 is coupled or inserted in the rearward body 132. More particularly, the interface portion 160a is positioned to protrude through the aperture 132m of the rearward body 132, the locking portion 160b is positioned in the slot 132l of the rearward body 132, the spring portion 160c is positioned between two members or protrusions of the rearward body 132, and the guide portion 160d is positioned within the slot 132n of the rearward body 132. The locking member 160 may be coupled to the rearward body 132 before or after the spring 150 is coupled to the arbor 140.

According to an exemplary embodiment, the cord 22 is coupled to the arbor 140. For example, the cord 22 may be placed or wedged into a slot 148 in the outer flange 147 of the arbor 140 (or woven in a serpentine manner in a series of slots 148 in the outer flange 147), so as to extend from the intermediate cavity 140b to the outer cavity 140c. The cord 22 may, for example, be coupled to the arbor 140 after the spring 150 is coupled to the arbor 140.

According to an exemplary embodiment, the cord 22 is coupled to the spring cover 136. More particularly, the cord 22 is positioned through the aperture 136e and in the channel 136f, so as to extend from an inner side of the spring cover 136 to an outer side (i.e., through the aperture 136e) and to be securely coupled to the spring cover 136 (i.e., by being tightly held in the channel 136f). As discussed previously, the cord 22 of a completed headset 20 may be slid through a slit in the extension 136g running through the aperture 136e and channel 136f, or the end of the cord 22 of an uncompleted headset 20 (i.e., without the connector 7 or speakers 24a, 24b) may be threaded through the aperture 136e and later connected to the connector 7 or speakers 24a, 24b (e.g., by soldering). The cord 22 may be coupled to the spring cover 136 before or after the cord 22 is coupled to the arbor 140.

According to an exemplary embodiment, the jack, plug, or connector 7 is coupled to the slide member 107. For example, the connector 7 may be partially surrounded by portions of the slide member 107, which are coupled to each other and to the connector 7 (e.g., with adhesive).

According to an exemplary embodiment, ends of the cord 22 are adjusted to proper length. For example, the end of the cord 22 to which the speakers 24a, 24b are coupled is pulled through the slot or slots 148 until a desired length of the cord 22 extends between the outer flange 147 of the arbor 140 and the speakers 24a, 24b (e.g., to provide the retractable portion of the cord 22 with desired length). The end of the cord 22 to which the connector 7 is coupled (or is to be coupled) is pulled through the aperture 136e and channel 136f of the spring cover 136 until a desired length of the cord 22 extends between the spring cover 136 and the connector 7 (e.g., to allow for proper positioning and movement of the connector 7 for removably connecting to the portable media player 2).

Adjusting the length of the cord 22 may also provide for a desired length of cord 22 to form the inner winding 23a (i.e., the segment of the cord 22 extending between the aperture 136e of the spring cover 136 and the slot 148 of the arbor 140). Adjusting the length of the retractable portion of the cord 22 occurs after the cord is coupled to the arbor 140, and adjusting the connector length of the cord 22 occurs after the cord 22 is coupled to the spring cover 136.

According to an exemplary embodiment, after the cord 22 is coupled to the spring cover 136 and the arbor 140 and after the cord 22 is adjusted to desired lengths, the cord 22 is wound about the flange 136b of the of the spring cover 136. More particularly, the cord 22 is wound in a single plane (i.e., such that each successive revolution of the cord is disposed radially outward) to form the inner winding 23a.

According to an exemplary embodiment, after the cord 22 wound about the spring cover 136 to form the inner winding 23a, the spring cover 136 and the arbor 140 are brought together to form an arbor/spring cover assembly. More particularly, the inner winding 23a and the flange 136b of the spring cover are positioned in the intermediate cavity 140b between the inner flange 143 and outer flange 147 of the arbor 140.

According to an exemplary embodiment, the arbor 140, spring cover 136, and spring 150 are coupled to the rear body 132. More particularly, the arbor/spring cover assembly is placed into the recess 132b of the rearward body 132. within the outer annular flange 132. Simultaneously, the post 132a is inserted into the central apertures 144, 136c of the arbor 140 and spring cover 136, respectively, and the inner end 151 of the spring is inserted into the slot 132d of the post 132a. The clip or fastener 161 is then inserted into the annular groove 132i of the post 132a, so as to couple or retain (e.g., prevent outward movement of) the arbor 140, spring cover 136, and spring 150 relative to the rearward body 132 by engaging an outer surface of the spring cove 136. The clip 161, preferably, does not prevent hinder rotation of the spring cover 136 relative to the post 132a.

Figure 30:
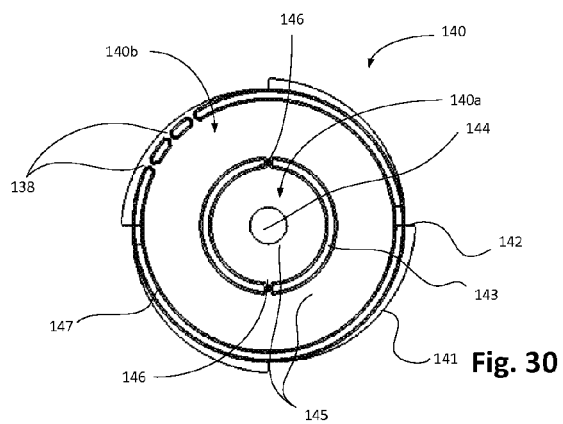
FIG. 30 is a front plan view of an arbor component of the case as shown in FIG. 19.

According to an exemplary embodiment, after being coupled to the rear body 132, the arbor 140, spring cover 136, and spring 150 are rotated around the post 132a in unison to load the spring 150. As shown in FIG. 30, a winding tool 80 engages and rotates both the arbor 140 and spring cover 136 about the post 132. The winding tool 80 includes spaced apart protrusions 81 that are inserted into opposing, peripheral slots 136h of the spring cover 136, such that rotation of the winding tool 80 causes rotation of the spring cover 136. The protrusions 81 extend further through the slots 136h to be positioned adjacent the periphery of the 141 of the arbor 140 to, when rotated, engage the teeth 142 of the arbor 140. The winding tool 80 is then rotated several rotations in a direction opposite that of the inner winding 23a. As the components are rotated, the inner winding 23a is unwound and eventually rewound opposite the direction of its original winding (i.e., is rewound in the direction in which the components are being rotated by the winding tool) about the flange 136b of the spring cover 136. Further, as the components are rotated, the spring 150, being held at its inner end 151 in a fixed position by the post 136a, is elastically deformed or loaded (e.g., either being wound tighter or looser than its relaxed state). The locking member 160 may engage the teeth 142 to prevent unintended counter rotation (due to the spring 150 being loaded or unrelaxed). It is further noted that during this initial stage of rotation, the retractable and connector portions of the cord 22 are not wound about any portion of the retractor mechanism and are not coupled to any fixed portion of the case 102, but rather remain loose. When the spring 150 is loaded, the components may be rotated a greater number of rotations than that corresponding to the retractable portion of the cord 22 (i.e., than the number of revolutions of the cord 22 of the outer winding 23b), such that the spring 150 is preloaded (i.e., partially loaded) when the cord 22 is fully retracted. That is, the retractable portion of the cord 22 is held in tension when fully retracted. This pretensioning of the spring helps ensure that the cord 22 is fully retractable in a reliable manner.

According to an exemplary embodiment, after the spring 150 is loaded, the spring cover 136 is rotated into final alignment. More particularly, the spring cover 136 is rotated a partial rotation opposite the rotation direction for loading, if at all, such that the connector portion of the cord 22 (e.g., the aperture 136e of the spring cover 136) is disposed toward the lower end of the case 102 (or side of the case 102 corresponding to the port location of the portable media player 2). It is noted that the cord 22 may be coupled to the channel 136f at this stage rather than when placed into the aperture 136e (e.g., by being pressed into the channel 136f).

According to an exemplary embodiment, after the spring 150 is loaded, the retractable portion of the cord 22 is positioned between members 132k to extend through the opening 132j and out of the recessed portion 132b of the rearward body 132.

According to an exemplar embodiment, after the spring cover 136 is moved into final alignment and the cord 22 is positioned in the opening 132j, the inner cover 134 is coupled to the rearward body 132. In particular, the central aperture or cutout 134b receives the spring cover 136 therein. The shape of the cutout 134b corresponds to the peripheral shape of the spring cover 136, such that the inner cover 134 may prevent rotation of the spring cover 136. The inner cover 134 encloses the cavity containing the components of the retractor mechanism. The inner cover 134 is coupled to the rearward body 132 with integrally formed positive engagement features (e.g., by snapping), fasteners, and/or adhesives. After the inner cover 134 is coupled to the rearward body 132, the locking member 160 may be actuated to release the arbor 140, such that the spring 150 rotates the arbor 140. The retractable portion of the cord 22 is pulled through the opening 132j by the arbor 140 and is wound about the arbor 140 to form the outer winding 23b.

According to an exemplary embodiment, after the inner cover 136 is coupled to the rearward body 132, the slide member 107 is positioned in the channel 131b of the forward body 131, and the forward body 131 is coupled to the rearward body 132 to form the lower portion 130b of the base 130.

According to an exemplary embodiment, the forward body 137 is coupled to the rearward body 138 to form the upper portion 130a of the base 130. In particular, the retractable portion of the cord 22 and button 137b are positioned between the forward body 137 and the lower body 138. The forward body 137 and the rearward body 138 are brought and coupled together, such that the cord 22 extends through the aperture 137c and the button 137b is positioned in the cavity defined between the forward and rearward bodies 137, 138.

According to an exemplary embodiment, after the upper and lower portions 130a, 130b of the case 102 are formed, a lower end of the portable media player 2 may be inserted into the lower portion 130b of the base 130 of the case 104, such that the connector 137 is inserted at least partially into the port of the portable media player 2. Then, an upper end of the portable media player 2 is inserted into the upper portion 130a of the base 130 of the case 104. The upper and lower portions 130a, 130b of the case 104 are then coupled to each other (e.g., with positive engagement features 130c) to retain the portable media player 2 therein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A headset retractor comprising:
   a headset having one or more speakers for outputting sound, a connector to be inserted into a portable media player, and a cord having one or more conductors extending continuously between the one or more speakers and the connector;
   an arbor around which the cord is wound; and
   a spring coupled to the arbor to rotate the arbor for winding the cord;

wherein the cord includes a retractable portion that is wound in a single plane about the arbor when retracted;
wherein the spring is wound in a single plane that is generally coplanar with the single plane in which the cord is wound; and
wherein the cord includes an inner winding and the retractable portion forms an outer winding, the inner winding and the outer winding being coplanar with the spring; and
wherein the inner winding is wound clockwise in a first state of retraction of the cord and is wound counter-clockwise in a second state of retraction.

2. The headset retractor of claim 1, wherein:
the headset retractor comprises a base that is configured as a removable case for a portable media player, the base defining a cavity therein; and
the arbor and the spring are disposed in the cavity, wherein the spring is configured to rotate the arbor relative to the base to wind the cord around the arbor.

3. The headset retractor of claim 2, wherein:
the base comprises a first member and a second member defining at least a portion of the cavity;
the first member includes an inner surface facing into the cavity and an outer surface facing an outer surface of a portable media player when the base is coupled thereto;
the second member includes an inner surface facing into the cavity and an outer surface facing away from the outer surface of the portable media player when the base is coupled thereto;
the arbor includes a generally planar portion having an inner surface and an outer surface, the outer surface of the arbor engaging the inner surface of the second member; and
the cord is positioned in the cavity and may contact the inner surface of the first member and the inner surface of the arbor.

4. The headset refractor of claim 3, further comprising a third member having an outer surface that is coplanar with the outer surface of the first member, wherein the first member is disposed within an aperture of the third member, and the cavity is defined by the first member, the second member, and the third member.

5. The headset retractor of claim 2, wherein the base includes an upper portion and a lower portion; and
wherein the upper portion is configured to releasably couple to the lower portion so as to generally surround a periphery of the portable media player and retain the portable media player therein.

6. The headset retractor of claim 5, wherein the lower portion includes a cavity in which the arbor and the spring are disposed, and the upper portion includes an aperture that the cord extends through and that is configured to prevent the one or more speakers from passing therethrough.

7. The headset retractor of claim 2, wherein the base includes a first member and a second member defining therebetween a cavity in which the spring and the arbor are disposed; and
wherein the second member includes a post extending into the cavity, the post being configured to couple to the first member to retain the spring between the first member and the second member and the arbor being configured to rotate about the post.

8. A headset refractor comprising:
a headset having one or more speakers for outputting sound, a connector to be inserted into a portable media player, and a cord having one or more conductors extending continuously between the one or more speakers and the connector;
an arbor around which the cord is wound; and
a spring coupled to the arbor to rotate the arbor for winding the cord;
wherein the cord includes a retractable portion that is wound in a single plane about the arbor when retracted;
wherein the spring is wound in a single plane that is generally coplanar with the single plane in which the cord is wound; and
a slide member coupled to the connector, the slide member being configured to slide the connector relative to a base of the retractor into and out of electrical connection with a port of the portable media player.

9. The headset retractor of claim 1, wherein:
the cord has a generally constant cross section for a majority of a length of the cord, the cross section having a major dimension and a minor dimension that is less than the major dimension; and
the retractable portion of the cord is wound with the major dimension extending generally in an axial direction relative to the arbor.

10. The headset retractor of claim 9, further comprising a base defining a cavity containing the arbor and the spring and in which the cord is wound, wherein the base defines an opening configured to orient the major dimension of the cord in the axial direction as the cord is retracted into the cavity to be wound about the arbor.

11. The headset retractor of claim 10, wherein the opening of the base has a width that is greater than the minor dimension of the cord and is less than the major dimension of the cord.

12. The headset retractor of claim 10, wherein a stationary portion of the cord does not move relative to the base and extends radially outward across the retractable portion of the cord, the minor dimension of the stationary portion of the cord extending generally in the axial direction.

13. The headset retractor of claim 1, wherein the spring, the inner winding, and the outer winding are coaxial, the inner winding being disposed radially outward of the spring and the outer winding being disposed radially outward of the inner winding.

14. The headset refractor of claim 13, wherein the headset retractor includes a base that is configured as a removable case for a portable media player, the arbor is configured to rotate relative to the base, and a stationary portion of the cord is fixed relative to the base and extends radially outward from the inner winding across the outer winding.

15. A case for a portable media player comprising:
a base configured to removably couple to the portable media player and having a first member and a second member defining a cavity therebetween; and
a retraction mechanism having an arbor and a spring disposed in the cavity of the base, the spring configured to rotate the arbor relative to the base to wind a cord around the arbor;
wherein the first member includes an inner surface facing into the cavity and an outer surface configured to be disposed against an outer surface of the portable media player when the case is coupled to the portable media player;
wherein the second member includes an inner surface facing into the cavity and an outer surface configured to be held by a user when the case is coupled to the portable media player;

wherein the arbor has an inner surface and an outer surface, the outer surface of the arbor engaging the inner surface of the second member; and wherein the cord is positioned in the cavity and may contact the inner surface of the first member and the inner surface of the arbor.

16. The case of claim 15, wherein:

the cord includes one or more conductors extending continuously between one or more speakers and a connector;

the cord includes a retractable portion that is wound in a single plane about the arbor when retracted; and the spring is wound in a single plane that is generally coplanar with the single plane in which the cord is wound.

17. The case of claim 15, wherein the second member includes a generally circular recess, and the arbor rotates within the recess.

18. The case of claim 17, wherein the recess forms a first portion of the inner surface of the second member, and the second member defines a second portion of the inner surface of the second member which is disposed closer to the outer surface of the portable media player than and radially outward of the first portion of the inner surface of the second member;

wherein a retracted portion of the cord is wound and positioned against the second portion of the inner surface of the second member.

19. The case of claim 15, further comprising a unitary locking member having a spring portion and a locking portion, wherein the arbor includes one or more teeth at an outer periphery thereof, and the spring portion biases the locking portion against one of the teeth of the arbor to prevent rotation thereof.

20. The case of claim 15, wherein the arbor includes an annular flange extending inward from the inner surface of the arbor, the flange defines a radially inner cavity in which the spring is generally positioned, and the cord includes a retractable portion that is configured to wind about the arbor radially outward of the flange.

21. The case of claim 15, wherein the cord is coupled at a first end directly to one or more speakers, and at a second end directly to a male connector configured to be received by the portable media player, the connector being movable relative to the base between a first position in which the connector is connected to the portable media player and a second positioned in which the connector is disconnected from the portable media player but is not fully removed from the portable media player.

22. The case of claim 15, wherein the arbor does not include a conductive portion for transferring an electronic signal between the connector and the one or more speakers.

23. The case of claim 15, wherein an input device is coupled to the cord and has a greater dimension than the cord.

24. The headset retractor of claim 8, wherein:

the base is configured as a removable case for a portable media player, the base defining a cavity therein; and the arbor and the spring are disposed in the cavity, wherein the spring is configured to rotate the arbor relative to the base to wind the cord around the arbor.

* * * * *